United States Patent
Ichino et al.

(10) Patent No.: US 7,201,546 B2
(45) Date of Patent: Apr. 10, 2007

(54) MACHINE TOOL AND METHOD FOR COMPUTING ATTACHMENT POSITION OF BALANCER IN MACHINE TOOL

(75) Inventors: Kentaro Ichino, Aichi pref. (JP);
Tohru Yamamoto, Aichi pref. (JP);
Yasuhiko Suzuki, Aichi pref. (JP);
Satoshi Okada, Aichi pref. (JP);
Masahiro Kurata, Aichi pref. (JP)

(73) Assignee: Yamazaki Mazak Corporation, Niwa Gun (JP)

( * ) Notice: Subject to any disclaimer, the term of this patent is extended or adjusted under 35 U.S.C. 154(b) by 2 days.

(21) Appl. No.: 11/190,207

(22) Filed: Jul. 25, 2005

(65) Prior Publication Data

US 2006/0018725 A1 Jan. 26, 2006

(30) Foreign Application Priority Data

Jul. 26, 2004 (JP) ............................ 2004-217615

(51) Int. Cl.
*B23Q 1/72* (2006.01)
*B23Q 1/01* (2006.01)
*B23Q 17/12* (2006.01)

(52) U.S. Cl. ........................ 409/165; 409/141; 408/143

(58) Field of Classification Search ................ 409/165, 409/166, 167, 168, 221, 222, 223, 141, 147, 409/186, 193, 207; 408/71, 143, 8; 29/27 C, 29/27 R; 82/122, 903; 451/8, 9, 353; 108/22; 360/98.07, 99.04, 99.08, 98.08, 99.05, 99.12; 310/51; 74/813 R, 813 L, 571.1, 570.2

See application file for complete search history.

(56) References Cited

U.S. PATENT DOCUMENTS

| | | | | | |
|---|---|---|---|---|---|
| 3,109,321 | A | * | 11/1963 | Rogers | ...................... 74/571.1 |
| 3,282,127 | A | * | 11/1966 | Deakin | ...................... 74/571.1 |
| 3,733,923 | A | * | 5/1973 | Goodrich et al. | .......... 74/570.2 |
| 3,757,638 | A | * | 9/1973 | Martin | ...................... 409/335 |
| 4,674,356 | A | * | 6/1987 | Kilgore | ...................... 74/570.2 |
| 5,239,892 | A | * | 8/1993 | Sakai | ...................... 74/813 L |
| 5,391,952 | A | * | 2/1995 | Simazu et al. | ................. 310/51 |
| 5,583,845 | A | * | 12/1996 | Aki | ............................ 720/704 |
| 5,711,192 | A | * | 1/1998 | Vasilantone | ............... 74/813 R |
| 5,784,932 | A | * | 7/1998 | Gilberti | .................... 74/813 R |
| 5,992,232 | A | | 11/1999 | Saitoh | |

(Continued)

FOREIGN PATENT DOCUMENTS

EP    1 063 506    12/2000

(Continued)

*Primary Examiner*—Dana Ross
(74) *Attorney, Agent, or Firm*—Workman Nydegger

(57) ABSTRACT

When a rotary table rotates, a main control section of a multi-tasking machine detects vibration of the rotary table on which a workpiece is mounted based on fluctuation of a position droop computed by a servo system. The main control section computes the arrangement position (the eccentricity amount and the eccentricity angle) of the workpiece with respect to the rotary table based on, for example, the detected vibration, the weight of the workpiece, and the rotation speed of the rotary table. The main control section computes the attachment position of a balancer with respect to the rotary table based on the computed arrangement position of the workpiece. Therefore, a suitable attachment position of a vibration suppressing balancer with respect to the rotary table is easily obtained.

13 Claims, 16 Drawing Sheets

U.S. PATENT DOCUMENTS 6,005,749 A * 12/1999 Ikuta et al. .............. 360/99.12
6,543,289 B1 * 4/2003 Jinzenji et al. ............... 73/668
6,901,830 B2 * 6/2005 Kawatsu et al. ............. 82/122

FOREIGN PATENT DOCUMENTS

| | | |
|---|---|---|
| GB | 674912 | 7/1952 |
| GB | 922217 | 3/1963 |
| JP | 59169751 | 9/1984 |
| JP | 2002-028858 | 1/2002 |
| WO | WO 73018 | 12/2000 |

* cited by examiner

Pulse Counter of Rotary Encoder

Position Droop

MACHINE TOOL AND METHOD FOR COMPUTING ATTACHMENT POSITION OF BALANCER IN MACHINE TOOL

RELATED APPLICATION

This application claims priority to Japanese Patent Application 2004-217615, filed on Jul. 26, 2004, which is incorporated herein by reference.

BACKGROUND OF THE INVENTION

The present invention relates to a machine tool equipped with a rotary table, and to a method for computing the attachment position of a balancer with respect to the rotary table.

A typical machine tool equipped with a rotary table is designed such that the rotary table is linearly moved forward and backward, and rotated. A workpiece attached to the rotary table is, for example, cut by a tool provided on a tool post.

Depending on the attaching state of a workpiece or a jig on the rotary table, a rotational imbalance may be caused on the rotary table. If such a rotational imbalance is caused, the rotary table vibrates. When a turning process is performed in this state, the workpiece becomes defective. In some cases, the rotary table might get broken, or the workpiece might be detached from the rotary table.

Therefore, a vibration sensor for detecting vibration of the rotary table may be provided on the rotary table. In this case, when the rotary table causes vibration due to the rotational imbalance, an operator is informed of the situation. However, since informing the operator of the situation does not eliminate the rotational imbalance, the problem caused by the rotational imbalance is not fundamentally solved.

Japanese Laid-Open Patent Publication No. 2002-28858 discloses a machine tool that causes a tool post equipped with a rotary tool to move forward and backward with respect to a workpiece. The machine tool includes a servo system that controls a linear motor that moves the tool post forward and backward with respect to the workpiece, and disturbance predicting means that predicts a disturbance that the rotational imbalance of the rotary tool causes to act on the servo system. The servo system is controlled to compensate for the influence of the disturbance predicted by the disturbance predicting means.

More specifically, based on a current command value output from a speed feedback loop of the servo system, and a position feedback value output from a position detector, which detects the position of the tool post, the disturbance that the rotational imbalance of the rotary tool causes to act on the servo system is predicted. In accordance with the predicted disturbance, a current command value entered to a current feedback loop of the servo system is corrected, compensating for the influence of the disturbance. As a result, the speed fluctuation of a grinding head caused by the rotational imbalance of the rotary tool is suppressed, which improves the machining accuracy of the workpiece.

However, the technique disclosed in the above publication is for suppressing the speed fluctuation of the grinding head, and does not eliminate the rotational imbalance of the rotary tool. Thus, even if the technique disclosed in the above publication is applied to the machine tool equipped with the rotary table, the rotational imbalance of the rotary table is not suppressed, and problems such as damage to the rotary table or detachment of the workpiece are not solved.

SUMMARY OF THE INVENTION

Accordingly, it is an objective of the present invention to easily achieve a suitable attachment position of a vibration suppressing balancer with respect to a rotary table.

To achieve the foregoing and other objectives and in accordance with the purpose of the invention, a method for computing an attachment position of a balancer with respect to a rotary table of a machine tool is provided. The method includes: detecting vibration of the rotary table when the rotary table on which an object is mounted is rotated; computing the arrangement position of the mounted object with respect to the rotary table based on the detected vibration, the weight of the mounted object, and physical quantity representing the rotation state of the rotary table; and computing the attachment position of the balancer with respect to the rotary table based on the computed arrangement position of the mounted object.

The present invention also provides a machine tool including a rotary table on which an object is mounted, a vibration detection section, an arrangement position computing section, and an attachment position computing section. The vibration detection section detects vibration of the rotary table during rotation of the rotary table on which the object is mounted. The arrangement position computing section computes the arrangement position of the mounted object with respect to the rotary table based on the detected vibration, the weight of the mounted object, and physical quantity representing the rotation state of the rotary table. The attachment position computing section computes the attachment position of a balancer with respect to the rotary table based on the computed arrangement position of the mounted object.

The present invention provides another including a rotary table, a rotary device, a movement device, a control section, and a vibration detection section. The rotary drive device rotates the rotary table. The movement device moves the rotary table along a predetermined moving direction. The control section controls the movement device and configures a servo system, which includes a position feedback loop. The vibration detection section detects vibration of the rotating rotary table based on an input value entered in the position feedback loop.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 19 is an explanatory diagram showing the balance between the workpiece and the balancer according to a second embodiment of the present invention; and.

DETAILED DESCRIPTION OF THE PREFERRED EMBODIMENTS

A first embodiment of the present invention will now be described with reference to FIGS. 1 to 18.

Figure 1:
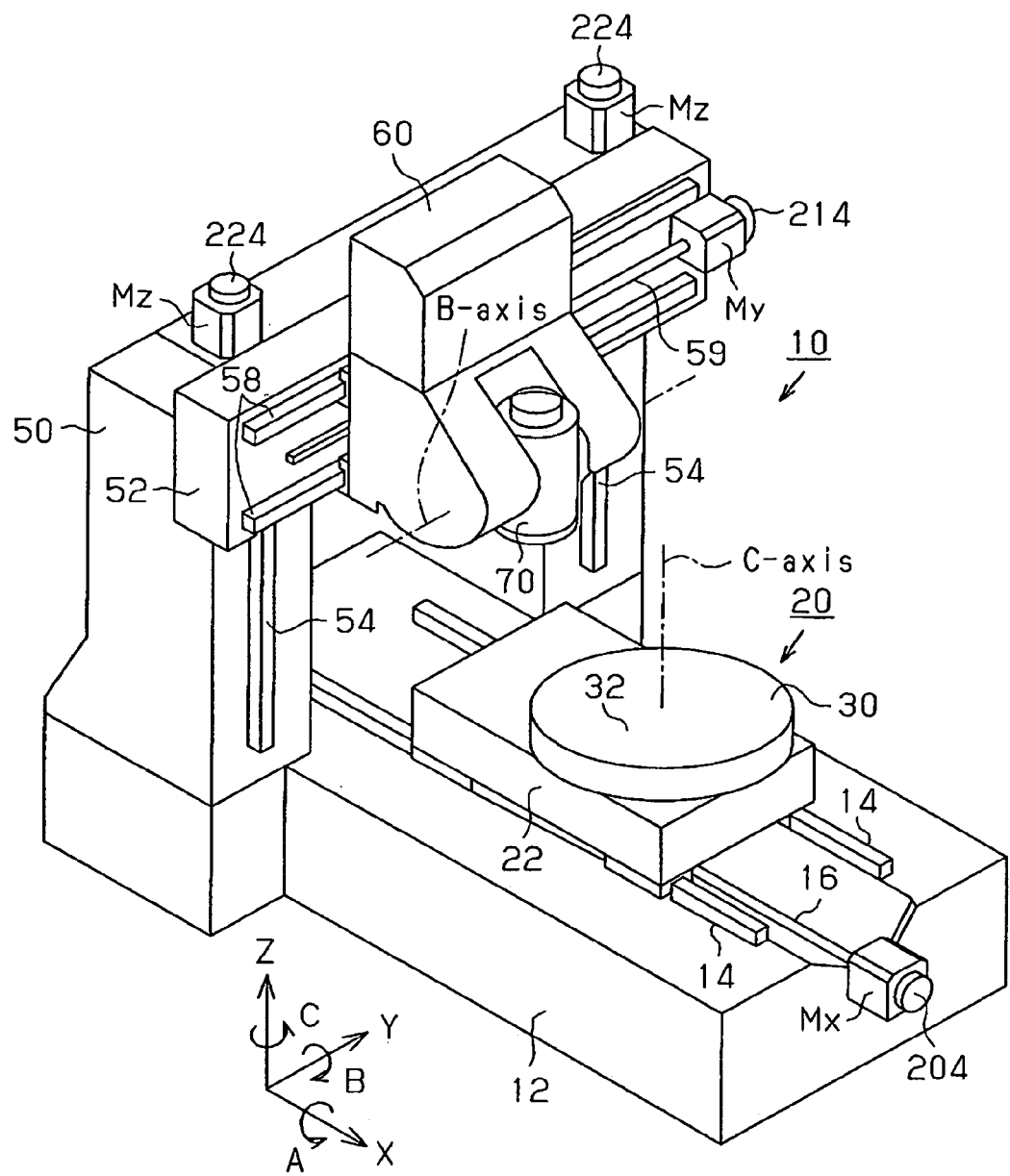
FIG. 1 is a schematic perspective view illustrating a multi-tasking machine according to a first embodiment of the present invention.

A multi-tasking machine 10 includes a bed 12 as shown in FIG. 1. Linear guide rails 14 (two in the drawing), which are parallel to each other, extend along an X-axis on the upper surface of the bed 12. A workpiece support apparatus 20 is provided on the linear guide rails 14. The workpiece support apparatus 20 includes a base 22. The base 22 is guided by the linear guide rails 14 and is movable along a predetermined moving direction, that is, the X-axis.

A nut 23 (see FIG. 4) is provided on the lower surface of the base 22, and the nut 23 is screwed to a ball screw 16 provided on the bed 12. The base 22 moves forward and backward or reciprocates along the X-axis as the ball screw 16 is selectively rotated forward and reverse by an X-axis drive motor Mx provided on the bed 12. The X-axis drive motor Mx functions as a movement device.

Figure 4:
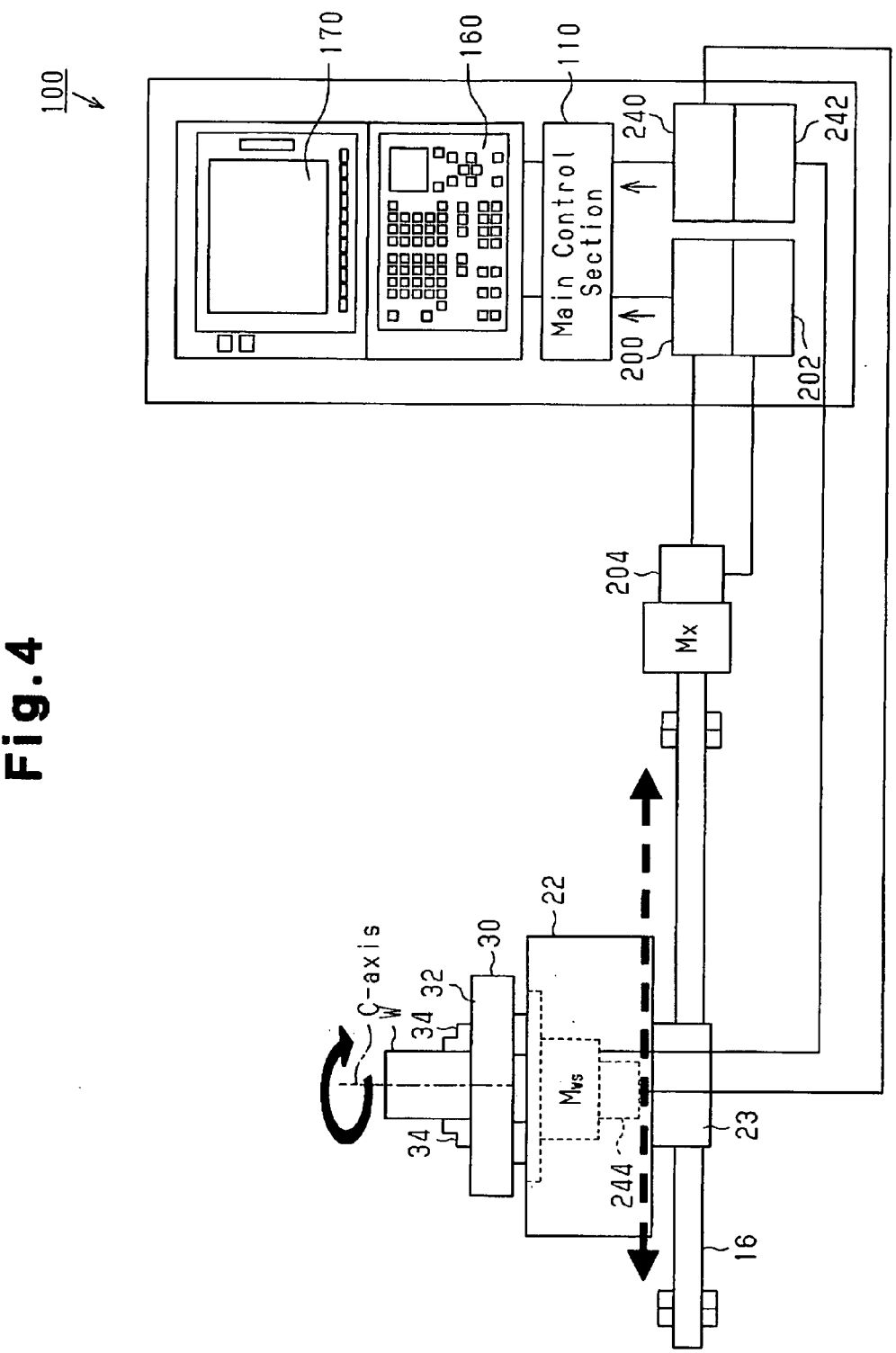
FIG. 4 is a schematic diagram illustrating the X-axis drive motor, the workpiece main spindle motor, and components related to the control thereof.
Figure 13:
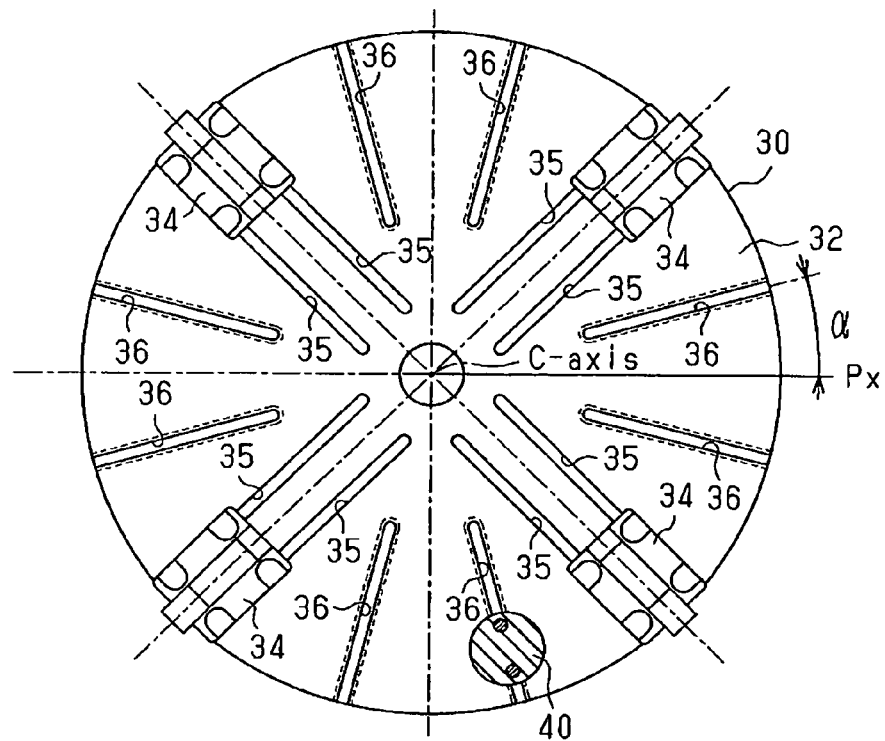
FIG. 13 is a plan view illustrating the rotary table.

A disk-like rotary table 30 is provided on the base 22 to be rotatable about a C-axis, which is parallel to a Z-axis. As shown in FIG. 4, the base 22 is provided with a rotary drive device, which is a workpiece main spindle motor $M_{ws}$ in the first embodiment, for rotating the rotary table 30. The upper surface of the rotary table 30 forms a workpiece mounting surface 32 on which the workpiece W is mounted. As shown in FIGS. 4 and 13, jigs 34 are mounted on the workpiece mounting surface 32. Each jig 34 reciprocates along one of pairs of guide grooves 35, which extend substantially radially from a rotational center (C-axis) of the rotary table 30, and is fixable to the workpiece mounting surface 32 with a fixing device, which is not shown. The jigs 34 removably hold the workpiece W on the workpiece mounting surface 32. The workpiece W and the jigs 34 correspond to mounted objects mounted on the rotary table 30.

Figure 14A:
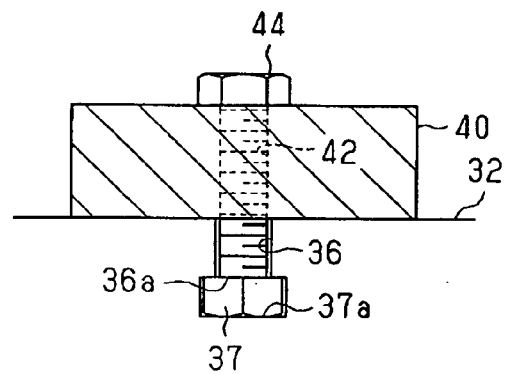
FIG. 14(a) and FIG. 14(b) are cross-sectional views illustrating the attachment arrangement of the balancer with respect to the rotary table.
Figure 14B:
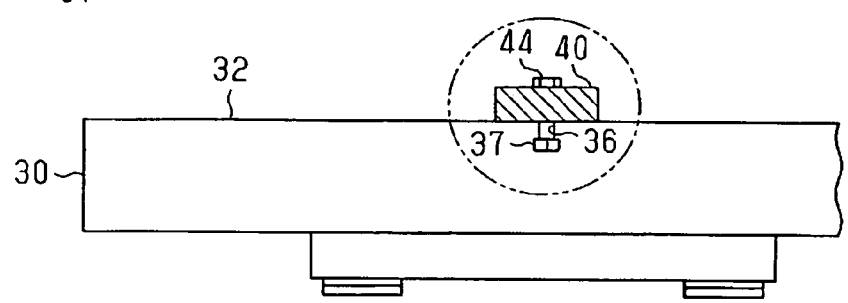

As shown in FIGS. 13, 14(a), and 14(b), balancer attachment grooves 36, which extend radially from the rotational center (C-axis) of the rotary table 30, are formed on the workpiece mounting surface 32. The attachment grooves 36 each have different arrangement angle α (see FIG. 13) with respect to a reference orientation position Px (reference angular position) defined on the rotary table 30 in advance. The reference orientation position Px is a specific angular position in the circumferential direction on the rotary table 30 serving as a reference. Each attachment groove 36 functions as a balancer attachment portion. The attachment grooves 36 are formed on the workpiece mounting surface 32, and are also open on the circumferential surface of the rotary table 30. Each attachment groove 36 has a reversed T-shaped cross-section as shown in FIGS. 14(a) and 14(b). The lower portion (bottom portion) of each attachment groove 36 is wide and the upper portion (opening side) is narrow.

A head portion 37a of a bolt 37, which serves as an attachment member, is selectively inserted in one of the attachment grooves 36 through the opening on the circumferential surface of the rotary table 30. The bolt 37 is slidable along the longitudinal direction of the attachment groove 36. The head portion 37a of the bolt 37 is engaged with a step 36A formed between the wide portion and the narrow portion of the attachment groove 36. The bolt 37 cannot be taken out from the opening on the workpiece mounting surface 32. When the bolt 37 is inserted in one of the attachment grooves 36, the distal end of the bolt 37 projects from the workpiece mounting surface 32 and is inserted in a through hole 42 formed in the balancer 40. Through holes 42 (two in FIG. 13) are formed in the balancer 40. The bolt 37 is selectively inserted in one of the through holes 42. In a state where the balancer 40 is fitted to the bolt 37 inserted in the attachment groove 36, the distal end of the bolt 37 projects from the balancer 40. A nut 44 is removably screwed to the distal end of the bolt 37.

As shown in FIG. 1, a portal column 50 is provided above the bed 12 astride the linear guide rails 14. Guide members, which are linear guide rails 54 (two in FIG. 1) in first embodiment, are located on the front surface of the column 50 extending along the Z-axis, which is the vertical direction. The linear guide rails 54 are parallel to each other. A saddle 52 is provided on the linear guide rails 54 to be movable along the Z-axis. A pair of nuts are provided on the surface of the saddle 52 facing the column 50. The nuts are respectively screwed to a pair of ball screws (not shown)

provided on the column 50. When a pair of Z-axis drive motors Mz located on the top surface of the column 50 rotates the corresponding ball screws forward and reverse, the saddle 52 reciprocates in the Z-axis direction.

Linear guide rails 58 (two in FIG. 1), which are parallel to each other, extend along a Y-axis on the surface of the saddle 52 opposite to the column 50. A head supporting device 60 is provided on the linear guide rails 58. The head supporting device 60 is guided by the linear guide rails 58 and is movable along the Y-axis direction. Nuts, which are not shown, are located on the surface of the head supporting device 60 facing the saddle 52. The nuts are screwed to a ball screw 59 provided on the saddle 52. When the ball screw 59 is rotated forward and reverse by a Y-axis drive motor My provided on the saddle 52, the head supporting device 60 reciprocates along the Y-axis direction.

A tool main spindle head 70 is pivotally located at the lower portion of the head supporting device 60 with the rotational center at a B-axis, which is parallel to the Y-axis. That is, the head supporting device 60 is provided with a B-axis drive motor Mb (see FIG. 2), and the B-axis drive motor Mb rotates the tool main spindle head 70 about the B-axis. The tool main spindle head 70 is equipped with a built-in tool main spindle motor $M_{TS}$ (see FIG. 2), and the tool main spindle motor $M_{TS}$ rotates a spindle, which is not shown. A machining tool for turning is attachable to the tool main spindle head 70. The tool main spindle head 70 is selectively locked at a certain angle with a lock mechanism, which is not shown, with the machining tool attached to the tool main spindle head 70.

Figure 2:
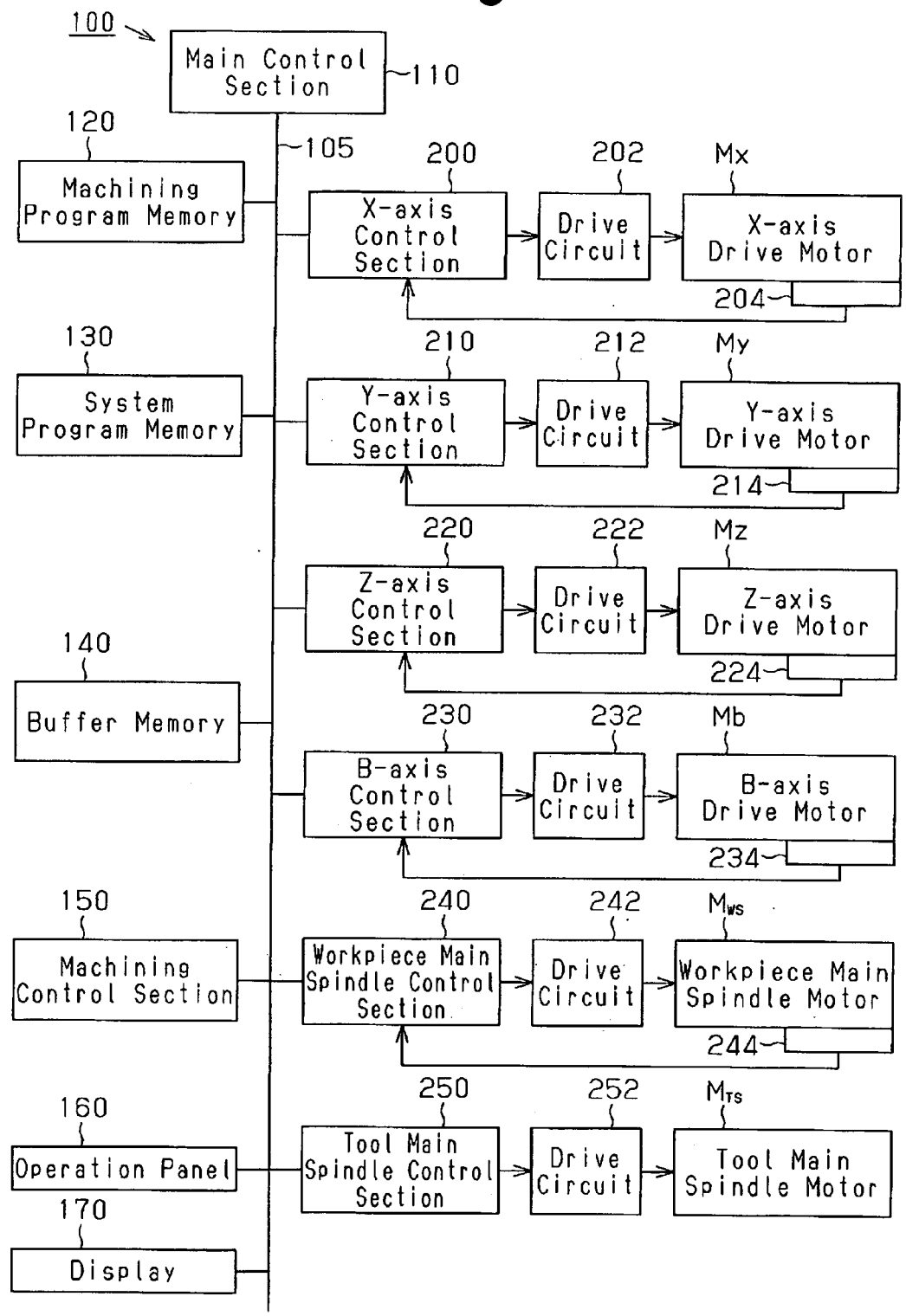
FIG. 2 is a block diagram showing the electrical configuration of a machining control device of the multi-tasking machine of FIG. 1.

The multi-tasking machine 10 is provided with a CNC control device, which is a machining control device 100 in first embodiment, as shown in FIG. 2. As shown in FIG. 2, the machining control device 100 includes a main control section 110, which is a CPU. The main control section 110 is connected to a machining program memory 120, a system program memory 130, a buffer memory 140, a machining control section 150, an operation panel 160, which includes a keyboard and the like, and a display 170, which is a liquid crystal display, through a bus line 105. The main control section 110 corresponds to a position control section that controls the position of the rotary table 30 in the moving direction (X-axis direction in first embodiment).

The main control section 110 is also connected to an X-axis control section 200, a Y-axis control section 210, a Z-axis control section 220, a B-axis control section 230, and a workpiece main spindle control section 240 through the bus line 105. Only one set of the Z-axis control section 220, a drive circuit 222, and the Z-axis drive motor Mz is shown in FIG. 2. However, two sets of the Z-axis control section 220, the drive circuit 222, and the Z-axis drive motor Mz actually exist corresponding to the two Z-axis drive motors Mz shown in FIG. 1. Each of the control sections 200, 210, 220, 230, 240 drives the corresponding one of the motors Mx, My, Mz, Mb, Mws in accordance with a command from the main control section 110 through the corresponding one of the drive circuits 202, 212, 222, 232, 242.

Position detectors, which are rotary encoders 204, 214, 224, 234, 244 are each attached to the corresponding one of the motors Mx, My, Mz, Mb, Mws. Each rotary encoder outputs a pulse signal corresponding to the rotation amount of the associated motor to the corresponding one of the control sections 200, 210, 220, 230, 240. The pulse signal is used to generate a position feedback signal or a speed feedback signal for the corresponding motor. The rotary encoder 204 corresponds to a position detector, which detects the position of the rotary table 30 in the moving direction, that is, in the X-axis direction.

When stopping the rotary table 30, the main control section 110 outputs a control signal for stopping the rotary table 30 at a predetermined stop rotational phase position to the workpiece main spindle control section 240 in accordance with a system program stored in the system program memory 130. The workpiece main spindle control section 240 controls the workpiece main spindle motor Mws such that the rotary table 30 stops at the stop rotational phase position based on the control signal. In the first embodiment, when the rotary table 30 is stopped at the stop rotational phase position, the reference orientation position Px defined on the rotary table 30 is parallel to the X-axis and is aligned with a line that passes through the rotational center (C-axis) of the rotary table 30.

Figure 3:
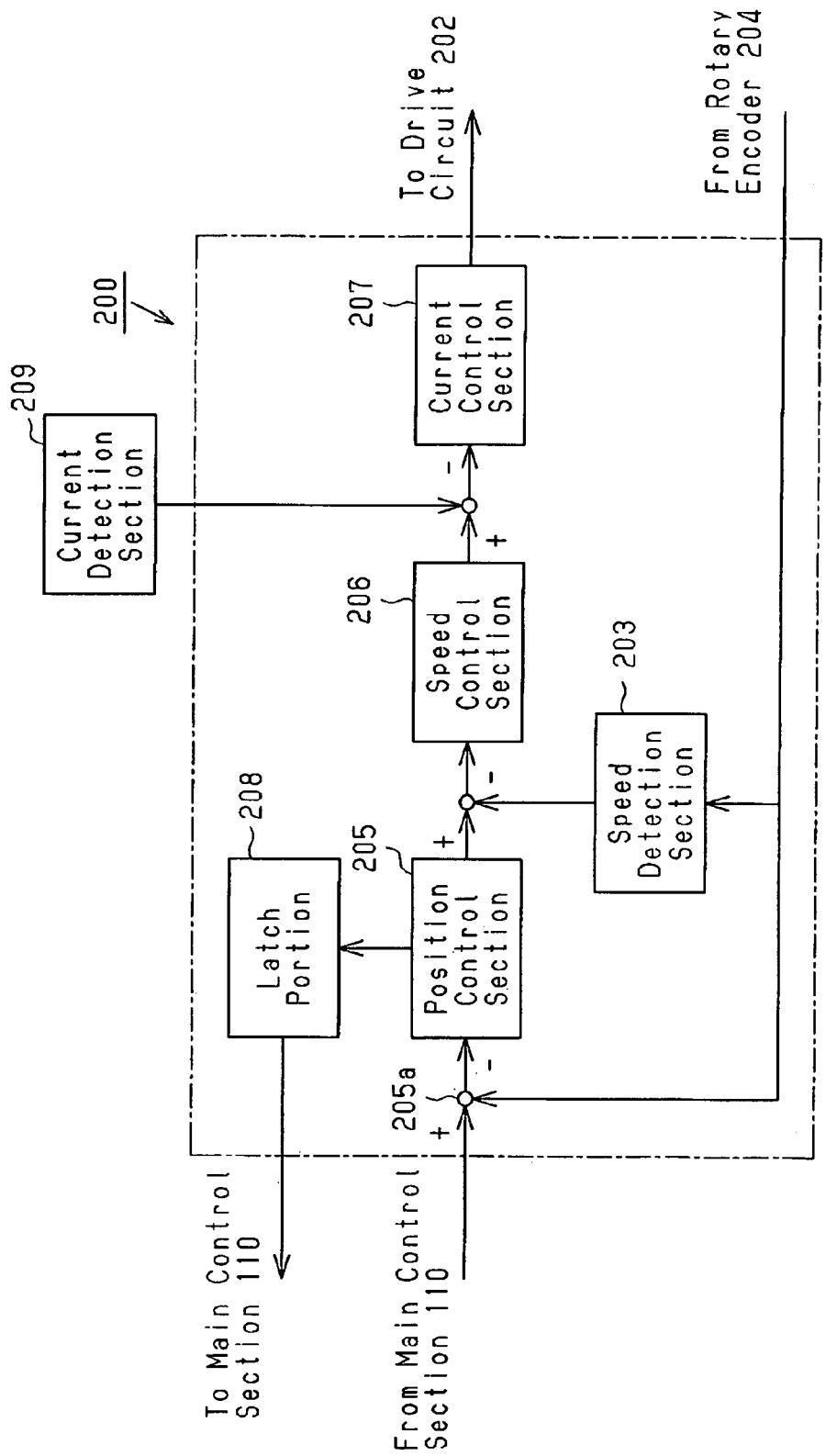
FIG. 3 is a block diagram showing the X-axis control section.

The X-axis control section 200, which is the characteristic configuration of the present invention, will now be described. As shown in FIG. 3, the X-axis control section 200 includes a speed detection section 203, a position control section 205, a speed control section 206, a current control section 207, and a latch portion 208. The speed detection section 203 produces a speed feedback signal from an output pulse (a position feedback signal) of the rotary encoder 204. The position control section 205 produces a speed command in accordance with a position command from the main control section 110 and an output pulse (a position feedback signal) from the rotary encoder 204. The position command from the main control section 110 represents the target position of the rotary table 30 in the X-axis direction. The output pulse from the rotary encoder 204 represents the actual position of the rotary table 30 in the X-axis direction. The difference between the position command and the position feedback signal is referred to as a position droop, which is computed using a subtractor 205a. As described above, the X-axis control section 200 configures a servo system that includes a position feedback loop. The position command and the position feedback signal correspond to input values entered to the position feedback loop.

The speed control section 206 produces a current command such that the difference between the speed command and the speed feedback signal becomes zero. As described above, the X-axis control section 200 includes a speed feedback loop. The current control section 207 produces a voltage command such that the difference between the current command and the current value detected by a current detection section 209 becomes zero. The current detection section 209, which is not shown in FIG. 2, detects the level of current (current value) that flows from the drive circuit 202 to the X-axis drive motor Mx. As described above, the X-axis control section 200 includes a current feedback loop. The latch portion 208 latches the position droop computed at any given time, and outputs to the main control section 110.

The Y-axis control section 210, the Z-axis control section 220, the B-axis control section 230, and the workpiece main spindle control section 240 shown in FIG. 2 differ from the X-axis control section 200 in that they do not include the latch portion 208. Therefore, the detailed explanations are omitted.

The drive circuit 202 shown in FIG. 2 includes an inverter circuit, which generates voltage that is actually applied to the X-axis drive motor Mx in accordance with the voltage command. Since the drive circuits 212, 222, 232, 242 have the same configuration as the drive circuit 202, the detailed explanations are omitted.

As shown in FIG. 2, the main control section 110 is connected to a tool main spindle control section 250 via the bus line 105. The tool main spindle control section 250 receives a spindle rotation command from the main control section 110 and outputs a spindle speed signal to a drive circuit 252. Based on the spindle speed signal, the drive circuit 252 rotates the tool main spindle motor $M_{TS}$ at a rotation speed that corresponds to the spindle rotation command, thereby rotating a cutting tool with the spindle.

A method for detecting vibration caused during rotation of the rotary table 30 of the multi-tasking machine 10 configured as described above will now be described.

Figure 5:
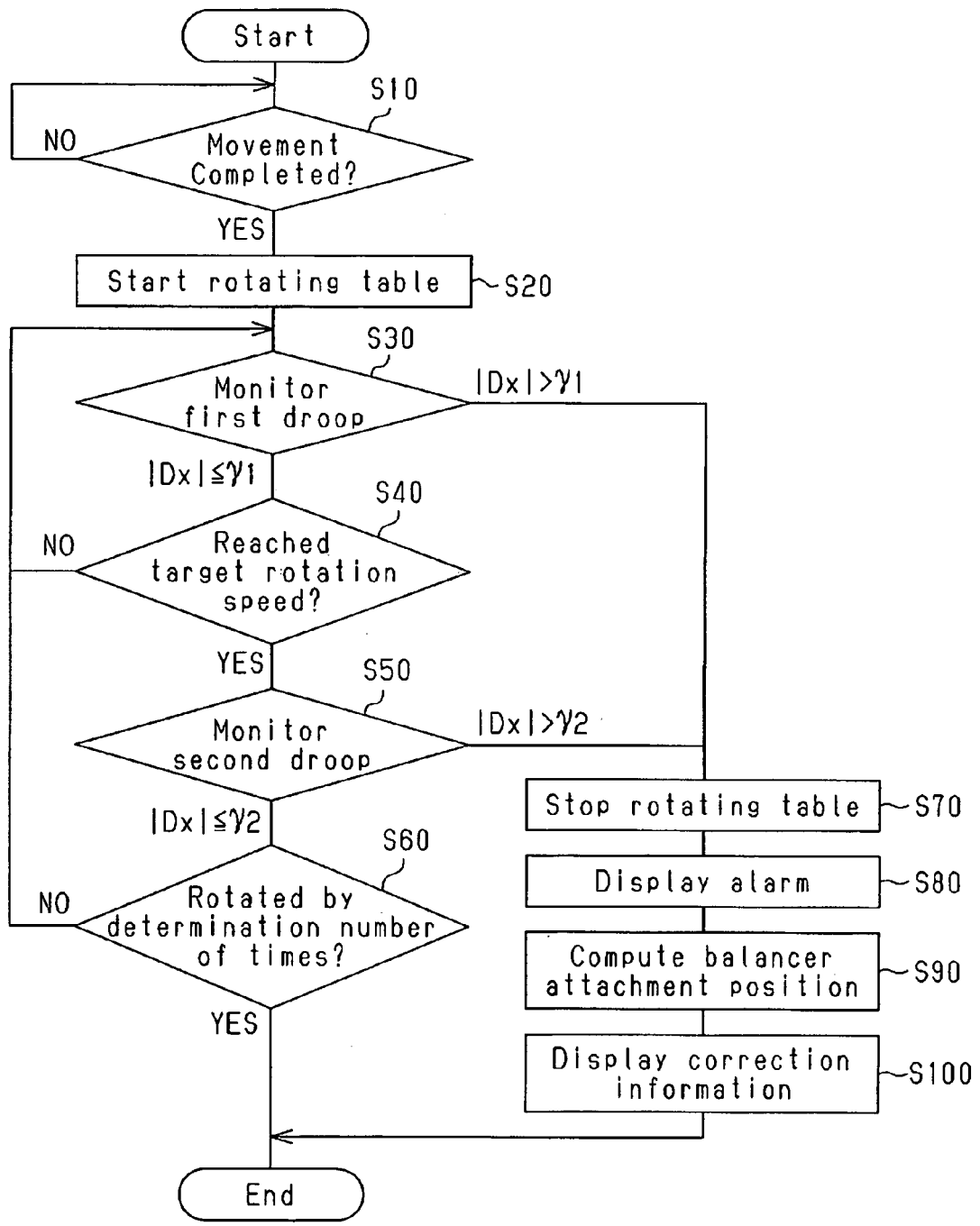
FIG. 5 is a flowchart showing the procedure for detecting vibration of the rotary table.

FIG. 5 is a flowchart showing the procedure for detecting vibration of the rotary table 30. FIG. 4 shows the X-axis drive motor Mx, the workpiece main spindle motor $M_{ws}$, and components related to the control thereof. The vibration detecting procedure shown in FIG. 5 is executed, for example, before executing various machining programs stored in the machining program memory 120, by the main control section 110 in accordance with a vibration detecting program stored in the system program memory 130. At first, the workpiece W is held on the rotary table 30 with the jigs 34, and the balancer 40 is not attached to the rotary table 30. In addition, the base 22 is located at the initial position (original position before starting machining).

(Step S10)

As shown in FIG. 5, at step S10, the X-axis control section 200 controls the X-axis drive motor Mx in accordance with a position command regarding the X-axis direction sent from the main control section 110 to move the base 22 from the initial position along the X-axis direction. The X-axis control section 200 then performs a position feedback control based on the output pulse from the rotary encoder 204, and determines whether the base 22 (the rotary table 30) has moved to the position corresponding to the position command. When the base 22 moves to the position corresponding to the position command, the X-axis control section 200 stops the base 22, and controls the X-axis drive motor Mx such that the base 22 is held at that position.

Even if the rotary table 30 is located at a position corresponding to the position command in the X-axis direction, the X-axis control section 200 continues computing the position droop, which is the difference between the position feedback signal based on the output pulse from the rotary encoder 204 and the position command. If the rotary table 30 is located at a position corresponding to the position command and the rotary table 30 is not vibrating, the position droop is zero.

(Step S20)

Subsequently, at step S20, the main control section 110 outputs a speed command to the workpiece main spindle control section 240, and starts rotating the rotary table 30. The speed command is output to the workpiece main spindle control section 240 such that the rotary table 30 rotates at a predetermined target rotation speed. The workpiece main spindle control section 240 performs the speed feedback control on the workpiece main spindle motor $M_{ws}$ based on the speed command and the output pulse from the rotary encoder 244.

(Step S30)

After outputting the speed command, the main control section 110 performs the first droop monitoring process of step S30 until the rotary table 30 reaches the target rotation speed. The first droop monitoring process performed during accelerated rotation of the rotary table 30 will now be described.

If rotational imbalance is caused when the rotary table 30 is stopped at the predetermined position in the X-axis direction, vibration occurs that corresponds to the rotation speed of the rotary table 30 and the degree of imbalance. That is, the level of vibration fluctuates in accordance with the level of the centrifugal force acting on the rotary table 30. The vibration appears as the fluctuation of the position droop in the X-axis direction via the ball screw 16. The centrifugal force acting on the rotary table 30 correlates to the amplitude of vibration generated on the rotary table 30, and the centrifugal force correlates to the position droop in the X-axis direction. In other words, the amplitude of vibration correlates to the position droop in the X-axis direction. Therefore, vibration of the rotary table 30 is detected by monitoring the fluctuation amount of the position droop in the X-axis direction.

Figure 9A:
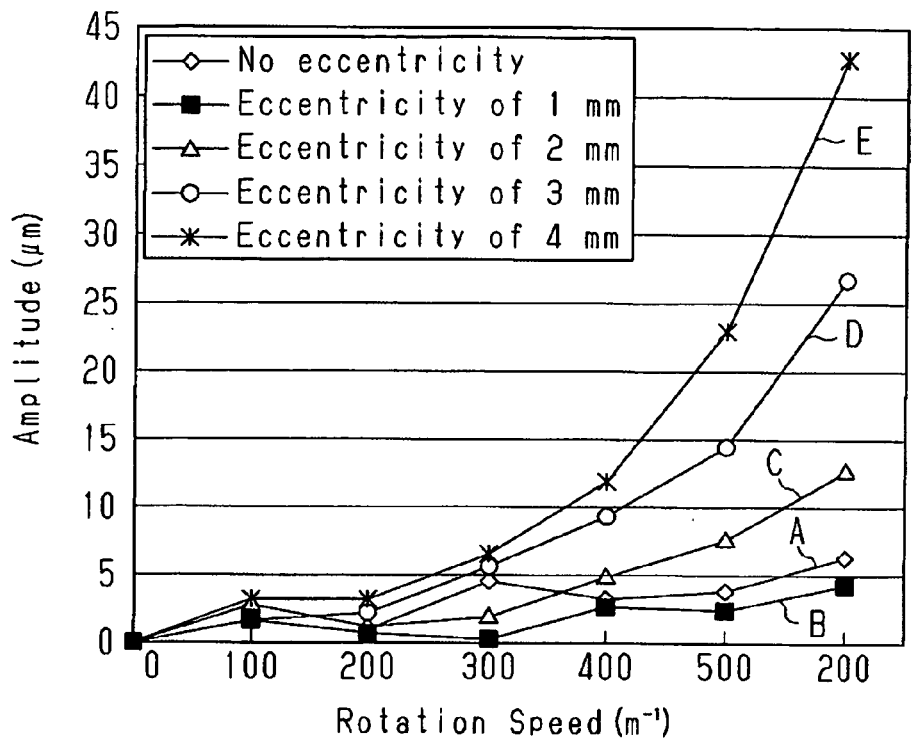
FIG. 9(a) is a graph showing the relationship between the rotation speed of the rotary table and the amplitude of vibration of the rotary table.
Figure 9B:
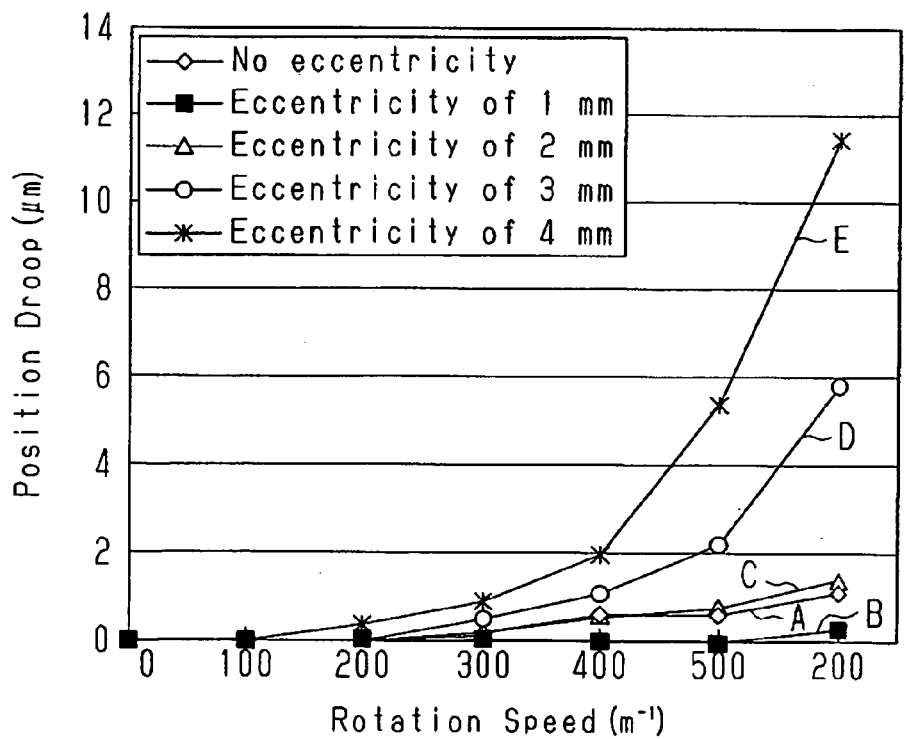
FIG. 9(b) is a graph showing the relationship between the rotation speed of the rotary table and the position droop in the X-axis direction.

FIG. 9(a) is a graph showing the relationship between the rotation speed of the rotary table 30 and the amplitude of vibration of the rotary table 30 in the X-axis direction. FIG. 9(a) shows the measurement results of the amplitude of vibration with respect to the rotation speed of the rotary table 30 according to five examples A to E in which the eccentricity amount of the workpiece W in the radial direction from the rotational center of the rotary table 30 is varied from zero to 4 mm by 1 mm increments. FIG. 9(b) is a graph showing the relationship between the rotation speed of the rotary table 30 and the position droop of the rotary table 30 in the X-axis direction. FIG. 9(b) shows the measurement results of the position droop with respect to the rotation speed of the rotary table 30 according to five examples A to E that are the same as those in FIG. 9(a).

Figure 10A:
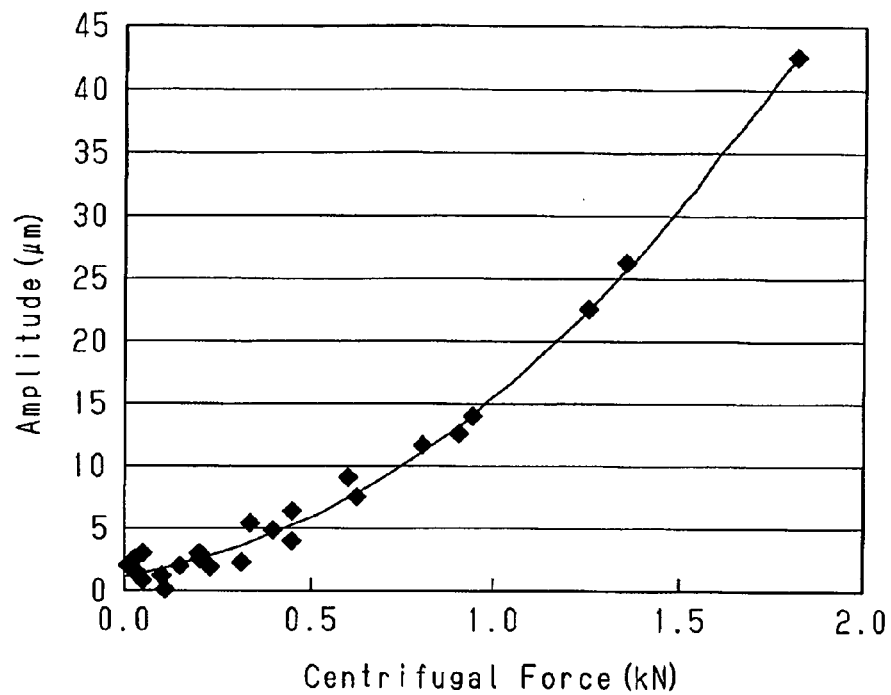
FIG. 10(a) is a graph showing the relationship between the centrifugal force acting on the rotary table and the amplitude of vibration of the rotary table.
Figure 10B:
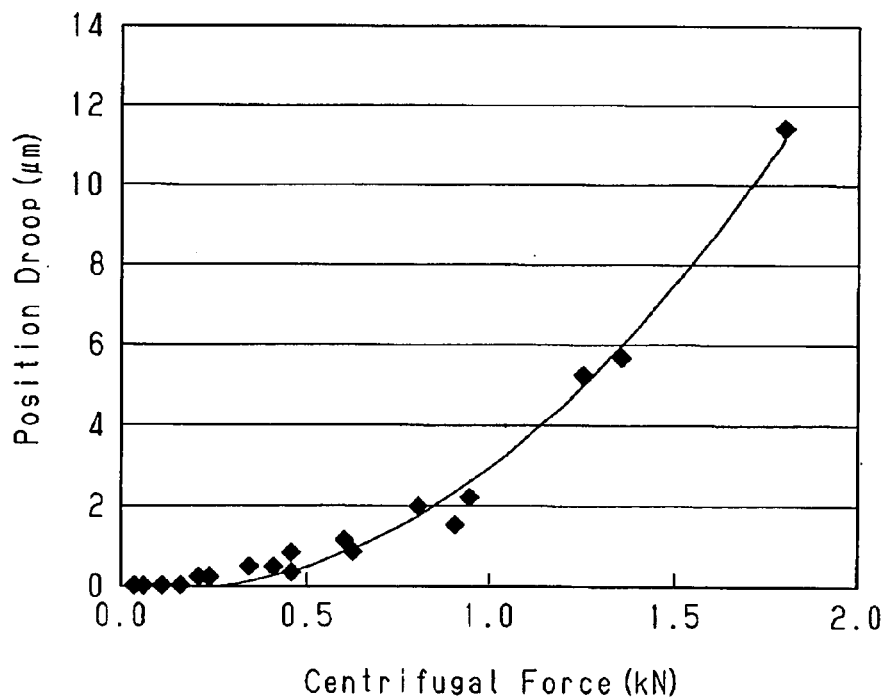
FIG. 10(b) is a graph showing the relationship between the centrifugal force acting on the rotary table and the position droop in the X-axis direction.

FIG. 10(a) is a graph showing the relationship between the centrifugal force acting on the rotary table 30 and the amplitude of vibration of the rotary table 30 in the X-axis direction. The graph is obtained from the measurement result shown in the FIG. 9(a). FIG. 10(b) is a graph showing the relationship between the centrifugal force acting on the rotary table 30 and the position droop of the rotary table 30 in the X-axis direction. The graph is obtained from the measurement result shown in FIG. 9(b). The centrifugal force acting on the rotary table 30 is computed using the following equation.

$$\text{Centrifugal Force } [kN] = (\pi^2 \cdot M \cdot R \cdot N^2)/(9 \times 10^8)$$

In the equation, M represents the weight [kg] of the workpiece W, R represents the eccentricity amount [mm] of the workpiece W from the rotational center (C-axis) of the rotary table 30, and N represents the rotation speed [min⁻] of the rotary table 30.

Figure 11:
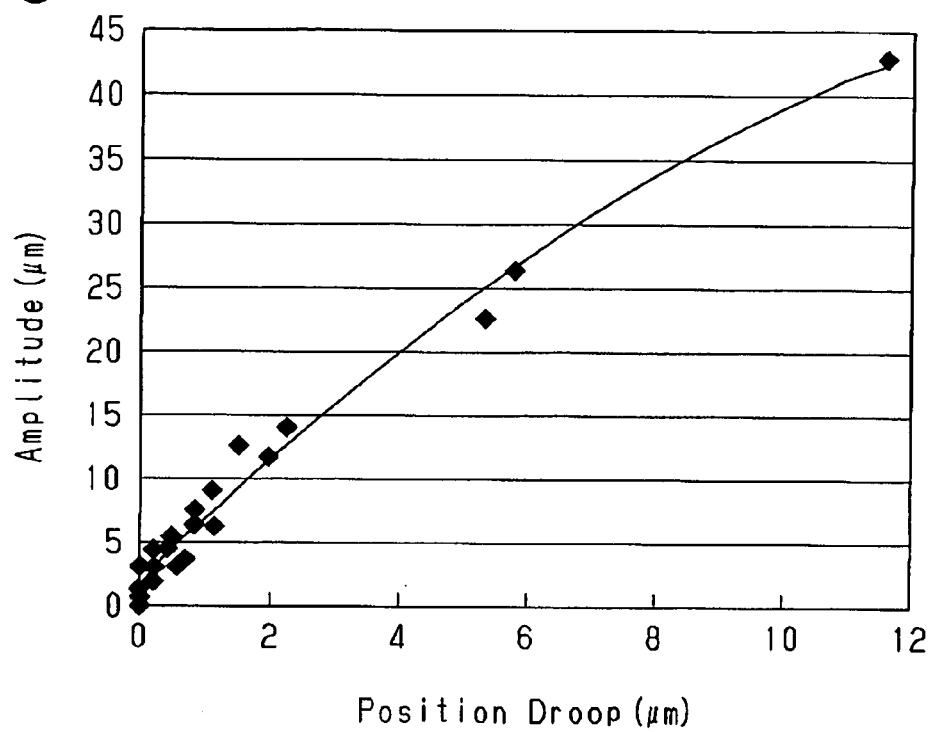
FIG. 11 is a graph showing the relationship between the position droop in the X-axis direction and the amplitude of vibration of the rotary table.

Based on FIGS. 10(a) and 10(b), the relationship between the position droop and the amplitude of vibration is represented by a graph of FIG. 11. As shown in FIG. 11, since the position droop has a close relationship to the amplitude of vibration, monitoring the position droop permits accurately estimating the level of the amplitude of vibration. Therefore, in the first droop monitoring process of step S30 in FIG. 5, the level of vibration of the rotary table 30 in the X-axis direction is detected by monitoring the fluctuation of the position droop in the X-axis direction.

When the position droop in the X-axis direction is represented by DX, the value of the position droop DX alternately changes between a positive value and a negative value due to the vibration of the rotary table 30. Therefore, at step S30 of FIG. 5, the main control section 110 determines whether the absolute value (|DX|) of the position droop entered from the latch portion 208 at a given time is less than or equal to a predetermined first threshold value γ1.

Figure 8:
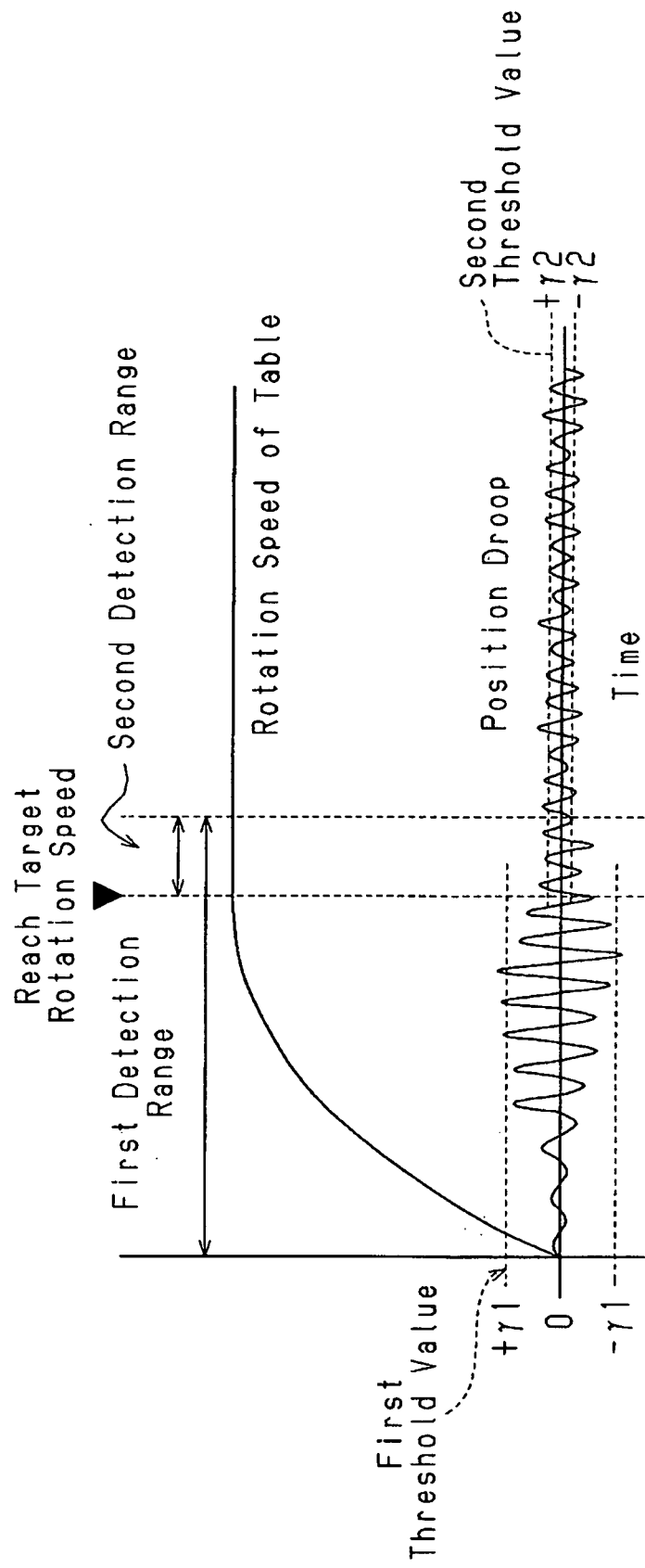
FIG. 8 is a graph for explaining a first threshold value and a second threshold value.

The first threshold value γ1 is set to a value greater than a second threshold value γ2, which will be described below. That is, rotation of the rotary table 30 is accelerated until the rotary table 30 reaches the target rotation speed. In this state, as shown in FIG. 8, the vibration of the rotary table 30 is greater as compared to a case where the rotary table 30 is rotated constantly at the target rotation speed. Therefore, in the first droop monitoring process performed during the accelerated rotation of the rotary table 30, the first threshold value γ1 is set to a relatively large value to increase the range of a permissible amplitude. In FIG. 8, a first detection range represents the time period during which the fluctuation of the position droop is judged using the first threshold value γ1.

At step S30, if the absolute value (|DX|) of the position droop is less than or equal to the first threshold value γ1, the main control section 110 proceeds to step S40, and if the absolute value (|DX|) of the position droop exceeds the first threshold value γ1, the main control section 110 proceeds to step S70.

(Step S40)

At step S40, the main control section 110 determines whether the rotation speed of the rotary table 30 has reached the target rotation speed. The rotation speed of the rotary table 30 is computed based on the output pulse from the rotary encoder 244. If the rotation speed of the rotary table 30 has not reached the target rotation speed, the main control section 110 returns to step S30. If the rotation speed of the rotary table 30 has reached the target rotation speed, the main control section 110 commands the workpiece main spindle control section 240 to maintain the rotation speed of the rotary table 30 at the target rotation speed, and then proceeds to step S50.

(Step S50)

At step S50, the main control section 110 performs a second detection droop monitoring process. The second droop monitoring process is a process for monitoring the fluctuation of the position droop output from the latch portion 208 of the X-axis control section 200 when the rotary table 30 is rotated constantly at the target rotation speed. If the absolute value (|DX|) of the position droop is less than or equal to the second threshold value γ2, which is smaller than the first threshold value γ1, the main control section 110 proceeds to step S60, and if the absolute value (|DX|) of the position droop exceeds the second threshold value γ2, the main control section 110 proceeds to step S70.

(Step S60)

At step S60, the main control section 110 determines whether the number of rotations of the rotary table 30 after reaching the target rotation speed has reached a predetermined determination number of times. The determination number of times may be, for example, few rotations. In FIG. 8, a second detection range represents the time period during which the fluctuation of the position droop is judged using the second threshold value γ2. The second detection range corresponds to time required for the number of rotations of the rotary table 30 to reach the determination number of times.

Figure 7A:
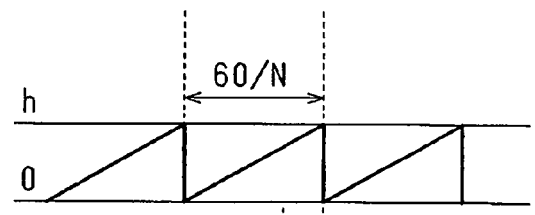
FIG. 7(a) is an explanatory diagram of a pulse counter of a rotary encoder.

The main control section 110 includes a pulse counter, which is not shown, for counting output pulses from the rotary encoder 244. As shown in FIG. 7(a), the pulse counter counts the output pulses of the rotary encoder 244 entered during 60/N. When the count value reaches a predetermined number h, the pulse counter resets the count value to zero and resumes counting. N represents the rotation speed [min$^{-1}$] of the rotary table 30. Every time the pulse counter counts the output pulses up to the predetermined number h, a rotation counter, which is not shown, of the main control section 110 increments the count value that represents the number of rotations of the rotary table 30 by one. If the count value of the rotation counter does not reach the determination number of times, the main control section 110 determines that the decision outcome of step S60 of FIG. 5 is negative, and returns to step S30. If the count value of the rotation counter has reached the determination number of times, the main control section 110 determines that the decision outcome of step S60 is positive, and ends the vibration detecting procedure.

In FIG. 5, if it is determined that the decision outcome of step S60 is negative, the main control section 110 returns to step S30. However, the main control section 110 may return to step S50.

(Steps S70 and S80)

If the absolute value (|DX|) of the position droop exceeds the first threshold value γ1 at step S30, or the absolute value (|DX|) of the position droop exceeds the second threshold value γ2 at step S50, the main control section 110 proceeds to step S70. At step S70, the main control section 110 outputs a stop control signal to the workpiece main spindle control section 240 to stop the rotary table 30 at the stop rotational phase position. At the subsequent step S80, the main control section 110 outputs an alarm signal to the display 170 to inform the operator of an abnormality. As a result, the workpiece main spindle control section 240 stops the workpiece main spindle motor $M_{ws}$, and stops the rotary table 30 at the stop rotational phase position. The display 170 simultaneously displays an alarm indicating, for example, that the rotation of the rotary table 30 has stopped or vibration has occurred. The stop control signal and the alarm signal correspond to signals indicating the abnormality of the rotary table 30.

(Step S90)

Figure 6:
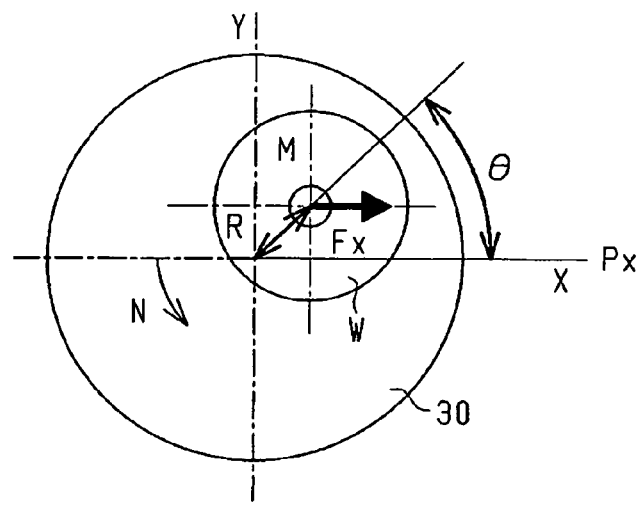
FIG. 6 is an explanatory diagram showing the rotary table and the workpiece on the rotary table.

At the subsequent step S90, the main control section 110 performs, for example, a procedure for computing the balancer attachment position. The computation procedure includes computation of the amount of the eccentricity R, computation of the eccentricity angle θ, and computation of the balancer attachment angle (θ+π). As shown in FIG. 6, the eccentricity amount R is an amount of radial displacement of the workpiece W from the rotational center of rotary table 30. The eccentricity angle θ is the displacement angle of the workpiece W from the reference orientation position Px in the circumferential direction. The balancer attachment angle (θ+π) is the angle of attachment position of the balancer 40 on the rotary table 30 from the reference orientation position Px in the circumferential direction. The eccentricity amount R and the eccentricity angle θ represent the arrangement position of the workpiece W with respect to the rotary table 30.

(Computation of Eccentricity Amount R)

The computation of the eccentricity amount R will now be described. In the following equations, the values are represented by the following symbols (see FIG. 6).

R: eccentricity amount [m]
N: rotation speed [min$^{-1}$] of the rotary table 30
ω: angular speed [rad/s] of the rotary table 30
M: weight [kg] of the workpiece W
Fx: centrifugal force acting on the rotary table 30 in the X-axis direction
Dx: position droop in the X-axis direction
θ: eccentricity angle [rad]
t: time The weight M of the workpiece W is entered via the operation panel 160 in advance and stored in the buffer memory 140. The mass M of the workpiece W is read from the buffer memory 140 when performing the system program.

The centrifugal force Fx is obtained using the following equations (1) and (2).

$$F_x = MR\omega^2 \cos(\omega t - \theta) \tag{1}$$

$$\omega = \frac{2\pi}{60} N \tag{2}$$

Figure 12:
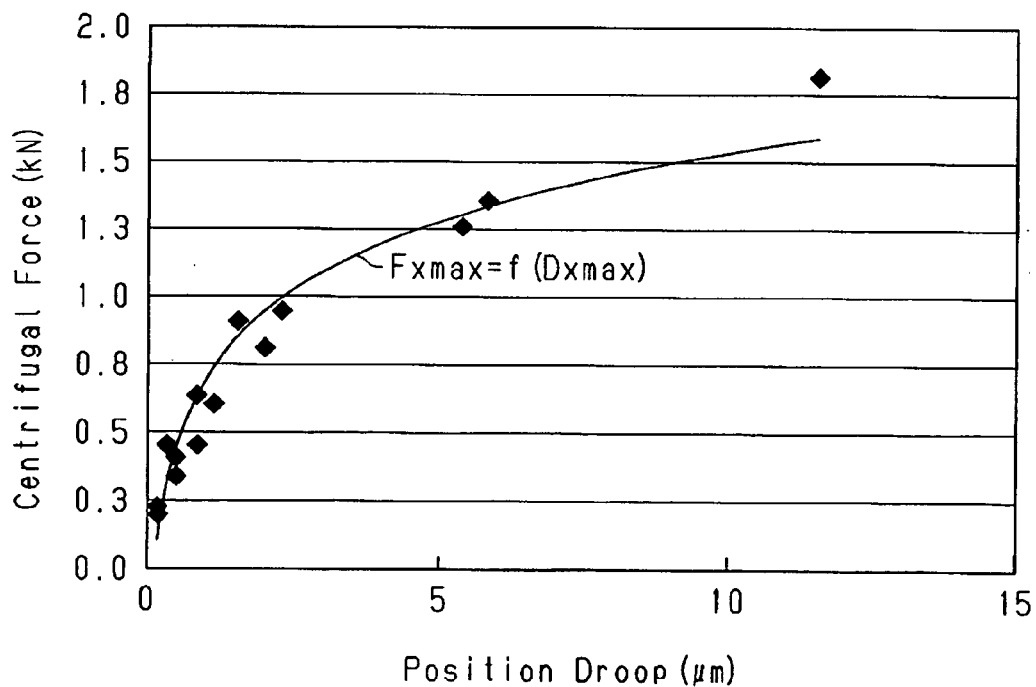
FIG. 12 is a graph showing the relationship between the position droop in the X-axis direction and the centrifugal force acting on the rotary table.

The maximum value Fxmax of the centrifugal force Fx is represented by the function of the maximum value Dxmax of the position droop Dx, more specifically, the polynomial expression of the maximum value Dxmax of the position droop Dx as shown in the following equation (3). FIG. 12 is a graph showing the relationship between the maximum value Dxmax of the position droop Dx and the maximum value Fxmax of the centrifugal force Fx according to the multi-tasking machine 10 of the first embodiment. FIG. 12 differs from FIG. 10(*b*) in that the horizontal axis is assumed to be the position droop Dx and the vertical axis is assumed to be the centrifugal force Fx. The curved line shown in the graph of FIG. 12 represents the function of the equation (3). The function of the equation (3) is defined based on data obtained through experiments in advance and is stored in the system program memory 130.

$$F_{xmax} = f(D_{xmax}) \tag{3}$$

The following equation (4) is obtained from the above equations (1) to (3). The main control section 110 computes the eccentricity amount R using the equation (4).

$$R = \frac{900}{\pi^2 M N^2} \cdot f(D_{x\,max}) \tag{4}$$

(Computation of Eccentricity Angle θ)

The main control section 110 computes the eccentricity angle θ using the following equation (5).

$$\theta = \omega \cdot \Delta t = \frac{2\pi}{60} \cdot N \cdot \Delta t \tag{5}$$

Figure 7B:
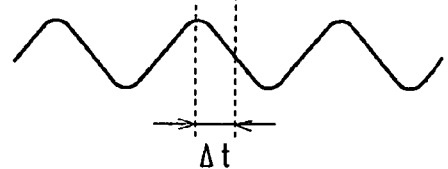
FIG. 7(b) is an explanatory diagram of a position droop in the X-axis direction.

In the first embodiment, the rotational phase position of the rotary table 30 when the count value of the pulse counter is reset to zero is defined as the stop rotational phase position. FIG. 7(*b*) shows the fluctuation of the position droop Dx. Δt in the equation (5) corresponds to a time period from when the position droop Dx has reached the peak value as shown in FIG. 7(*b*) to when the count value of the pulse counter of FIG. 7(*a*) is reset to zero. In other words, Δt corresponds to a time period from when the position droop Dx has reached the maximum value Dxmax until the rotary table 30 is rotated to the stop rotational phase position. Therefore, when the rotary table 30 is rotated to the stop rotational phase position simultaneously as the position droop Dx reached the maximum value Dxmax, Δt becomes zero. In this case, in accordance with the equation (5), the eccentricity angle θ is also zero. That is, when Δt is zero, the workpiece W is attached to the reference orientation position Px on the rotary table 30.

(Computing Balancer Attachment Angle (θ+π))

Figure 15A:
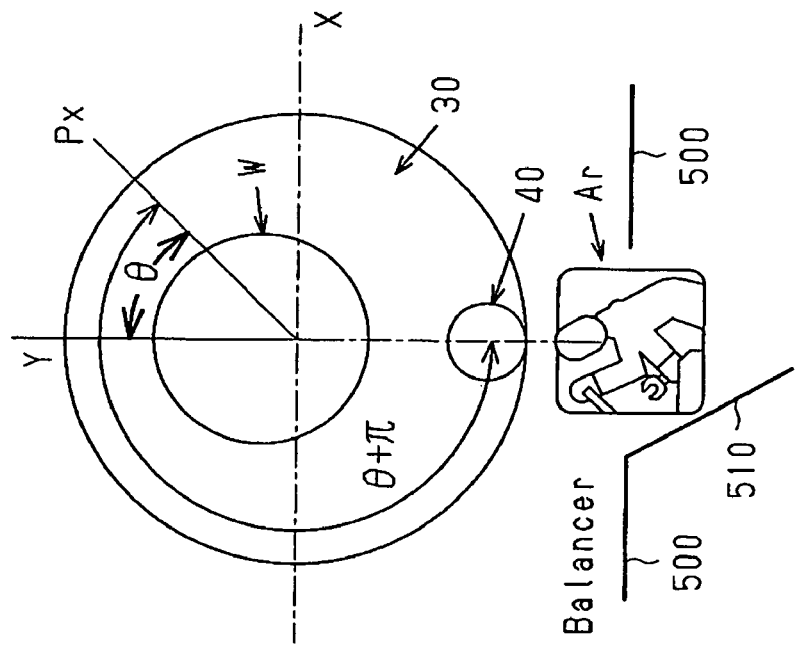
FIG. 15(a) is an explanatory diagram showing a state where the rotary table is arranged at the stop rotational phase position.
Figure 15B:
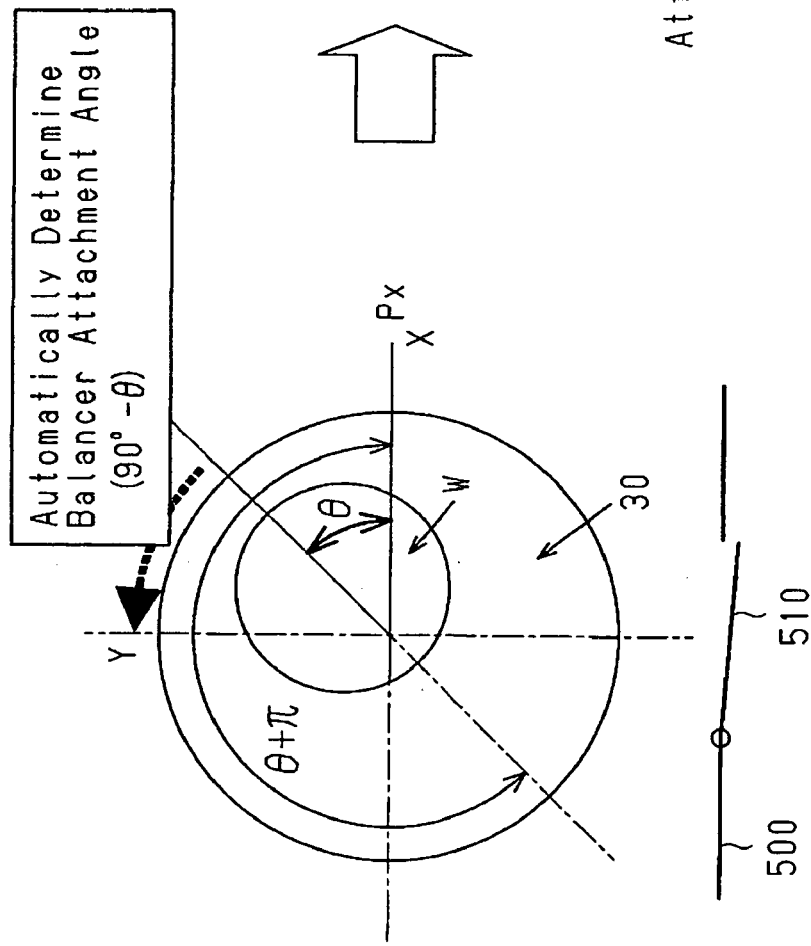
FIG. 15(b) is an explanatory diagram showing a state where the balancer attachment position faces an operation area.

The main control section 110 computes the balancer attachment angle (θ+π) in the following manner. FIG. 15(*a*) shows a state where the rotary table 30 is stopped at the stop rotational phase position. Although not shown in FIG. 1, a partition 500 and a machine door 510 are arranged along the path of the X-axis direction of the rotary table 30 as shown in FIG. 15(*a*). The operator can selectively attach and remove the workpiece W and the balancer 40 to and from the rotary table 30 by opening the machine door 510. An area formed by opening the machine door 510 serves as an operation area Ar for the operator to perform operation (see FIG. 15(*b*)).

In the first embodiment, when the rotary table 30 has a rotational imbalance, the workpiece main spindle motor $M_{ws}$ is controlled such that suitable attachment region (the attachment groove 36) of the balancer 40 on the rotary table 30 faces or comes adjacent to the machine door 510 (operation area Ar). More specifically, the main control section 110 computes the balancer attachment angle (θ+π) based on the computed eccentricity angle θ. The main control section 110 then computes the rotational angle (π/2−θ) of the rotary table 30 required for the attachment region on the rotary table 30 corresponding to the balancer attachment angle (θ+π) to face or come adjacent to the machine door 510. Subsequently, based on the rotational angle (π/2−θ), the main control section 110 controls the workpiece main spindle motor Mws. As a result, the attachment region (the attachment groove 36) corresponding to the balancer attachment angle (θ+π) faces or comes adjacent to the machine door 510 (see FIG. 15(*b*)).

(Selecting Balancer Attachment Region)

Figure 16:
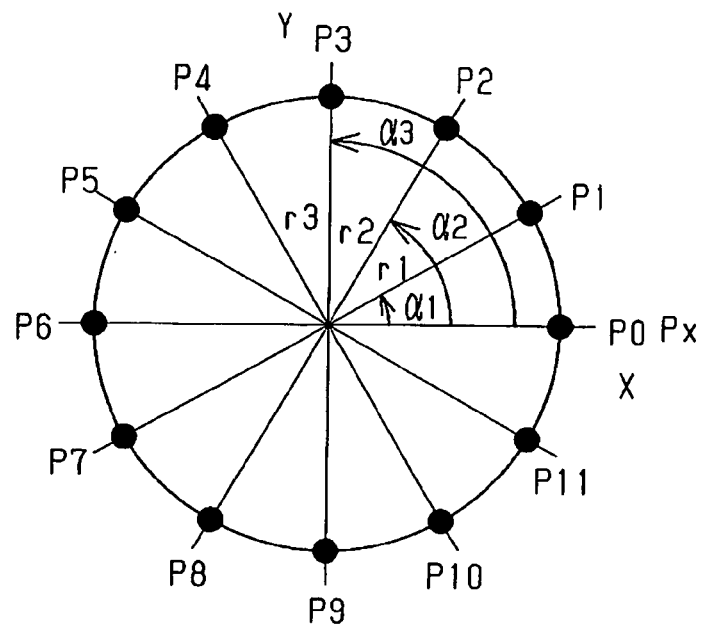
FIG. 16 is an explanatory diagram showing the attachment positions of the balancer.
Figure 17A:
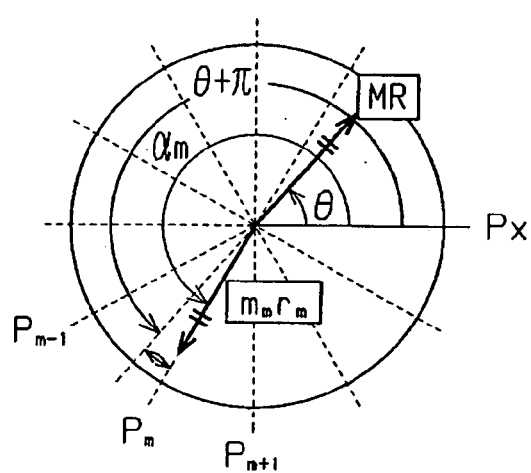
FIG. 17(a) is an explanatory diagram showing the balance between the workpiece and the balancer.
Figure 17B:
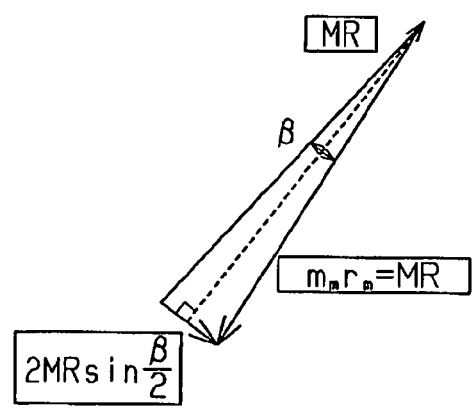
FIG. 17(b) is an explanatory diagram showing the difference β between the ideal attachment angle (θ+π) and the arrangement angle $\alpha_m$ of the balancer attachment position $P_m$ closest to the ideal attachment angle (θ+π)

In the first embodiment, the rotational imbalance of the rotary table 30 is suppressed using a single balancer 40. In this case, the attachment region of the balancer 40 is selected in the following manner. FIG. 16 shows an example of the positions of the balancer attachment regions (twelve in the drawing), that is, the balancer attachment positions $P_n$ (n=0 to 11) provided on the rotary table 30. The arrangement angle of each balancer attachment position $P_n$ with respect to the reference orientation position Px is represented by $\alpha_n$ (n=0 to 11). The arrangement angles α0 to α11 are stored as fixed values in the system program memory 130 in advance. FIG. 17(*a*) shows a state where the workpiece W and the balancer 40 are balanced on rotary table 30. FIG. 17(*a*) shows an ideal balancer attachment angle (θ+π) and the arrangement angle $\alpha_m$ of the balancer attachment position $P_m$ closest to the ideal attachment angle (θ+π) The balancer attachment position $P_m$ is a position to which the balancer 40 should actually be attached among balancer attachment positions P0 to P1. FIG. 17(*b*) shows the difference β between the ideal balancer attachment angle (θ+π) and the arrangement angle $\alpha_m$.

First, the main control section 110 computes the weight $m_m$[kg] of the balancer 40 to be attached using the following equation (6).

$$m_m = \frac{MR}{r_m} \tag{6}$$

In the equation, $r_m$ represents the distance [m] between the rotational center of the rotary table 30 and the balancer attachment position $P_m$, and is stored in the system program memory 130 in advance. As described above, R represents the eccentricity amount [m] of the workpiece W, and M represents the weight [kg] of the workpiece W.

The main control section 110 computes the difference β between each of the arrangement angles $\alpha_n$ (n=0 to 11) and the ideal balancer attachment angle (θ+π) using the following equation (8). The main control section 110 then selects the arrangement angle $\alpha_n$ at which the absolute value of the difference β becomes minimum as the arrangement angle $\alpha_m$ closest to the ideal balancer attachment angle (θ+π), and selects the attachment position $P_m$ having the arrangement angle $\alpha_m$ as a position to which the balancer 40 should actually be attached.

The centrifugal force $F_A$ generated by the rotational imbalance of the rotary table 30 in a state where the balancer 40 is attached to the attachment position $P_m$ is obtained using the following equation (7).

$$F_A = 2MR\omega^2 \sin\frac{\beta}{2} \qquad (7)$$

$$\beta = \alpha_n - \theta - \pi \qquad (8)$$

The main control section 110 determines whether the difference β between the ideal attachment angle (θ+π) of the balancer 40 and the arrangement angle $\alpha_m$ closest to the ideal attachment angle (θ+π) satisfies the following balance requirement.

$$-\pi/3 < \beta < \pi/3$$

If the difference β satisfies the balance requirement, the centrifugal force $F_A$ becomes less than the centrifugal force $MR\omega^2$ before attaching the balancer 40, which suppresses the vibration of the rotary table 30. If the difference β does not satisfy the balance requirement, the rotational imbalance of the rotary table 30 increases. That is, since the centrifugal force before attaching the balancer 40 is $MR\omega^2$, vibration of the rotary table 30 is suppressed if the centrifugal force $F_A$ after attaching the balancer 40 obtained using the equation (7) becomes less than $MR\omega^2$. To make the centrifugal force $F_A$ become less than $MR\omega^2$, |2 sin(β/2)|<1 must be true in the equation (7). |2 sin(β/2)|<1 can be transformed to |sin(β/2)| <½. To satisfy |sin(β/2)|<½, −π/6<β/2<π/6 must be true, that is, −π/3<β<π/3 must be true.

As described above, the main control section 110 outputs a selection signal, which is a control signal, to the workpiece main spindle control section 240 based on the rotational angle (π/2−θ) such that the attachment position $P_m$ having the arrangement angle $\alpha_m$ closest to the ideal balancer attachment angle (θ+π), in other words, the attachment groove 36 on the rotary table 30 to which the balancer 40 should actually be attached faces or comes adjacent to the machine door 510. The workpiece main spindle motor Mws rotates the rotary table 30 from the stop rotational phase position, and stops the rotary table 30 in a state where the attachment position $P_m$ faces or is adjacent to the machine door 510. The workpiece main spindle control section 240 and the workpiece main spindle motor Mws function as a rotation control section. FIG. 15(*b*) shows a case where the attachment position $P_m$ having the arrangement angle $\alpha_m$ closest to the ideal balancer attachment angle (θ+π) faces the machine door 510. To facilitate illustration, FIG. 15(*b*) shows a case where β=0 in.

(Step S100)

Figure 18:
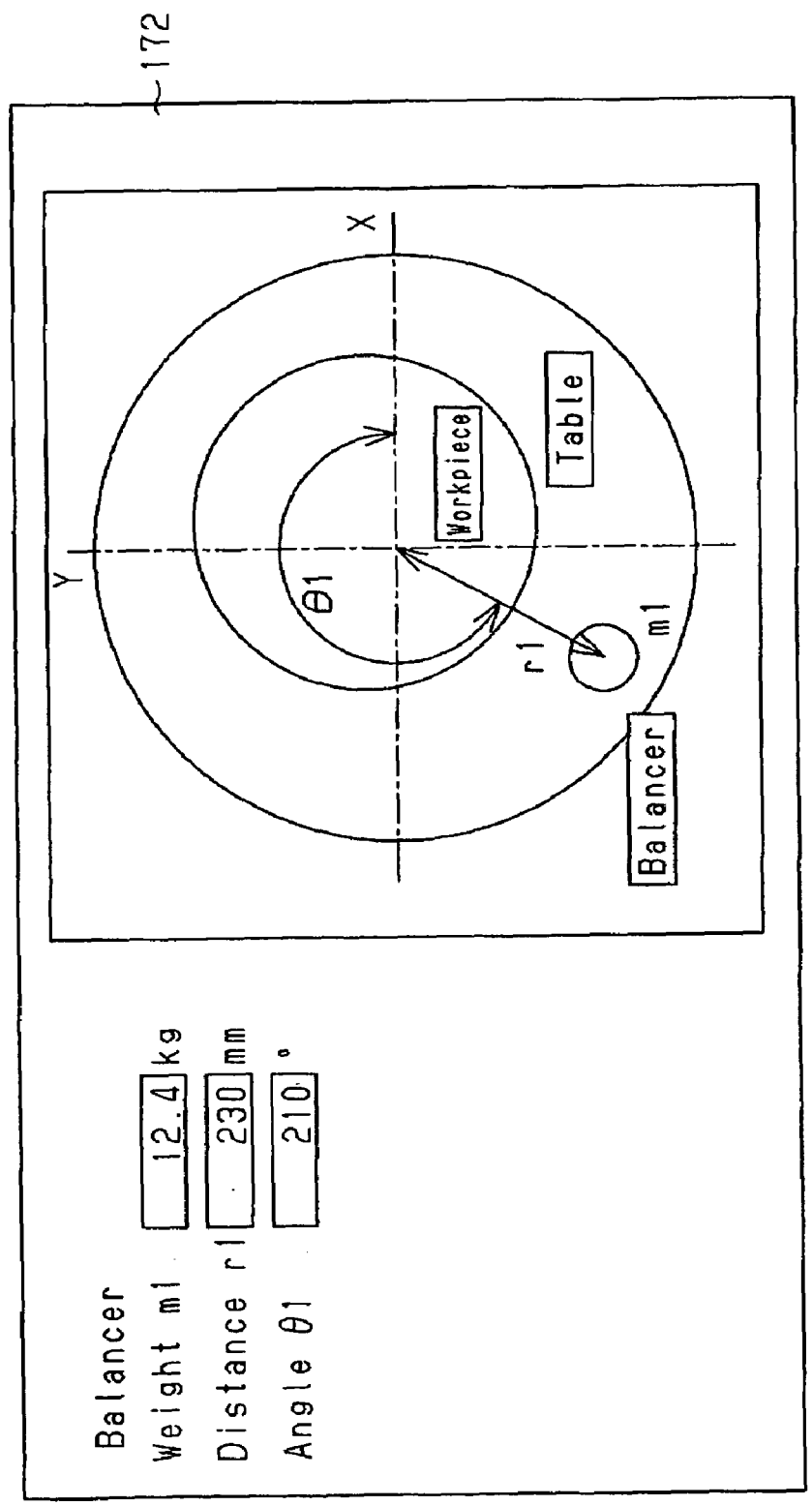
FIG. 18 is an explanatory diagram showing the display.

At step S100 of FIG. 5, the main control section 110 outputs a display signal representing the correction information of the rotational imbalance of the rotary table 30 to the display 170 based on the computation result at step S90. If the difference β satisfies the balance requirement, the correction information includes, the weight m1 (m1=$m_m$) of the balancer 40 to be used, the distance r1 (r1=$r_m$) between the rotational center of the rotary table 30 to the attachment position of the balancer 40, and the arrangement angle θ1 (θ1=$\alpha_m$) of the attachment groove 36 (attachment region) to which the balancer 40 should be attached. As shown in FIG. 18, the display 170 displays the correction information on a display screen 172 based on the display signal. The main control section 110 outputs a control signal to the display 170 such that the arrangement of the balancer 40 with respect to the rotary table 30 is displayed on the display screen 172. After displaying the correction information on the display 170, the main control section 110 ends the procedure of FIG. 5.

The operator prepares the balancer 40 having the weight m1 displayed on the display screen 172. The attachment groove 36 to which the balancer 40 should be attached is arranged in the vicinity of or facing the machine door 510. Therefore, at the operation area Ar, the operator inserts the bolt 37 to the attachment groove 36, and attaches the balancer 40 to a portion of the bolt 37 protruding from the attachment groove 36. After moving the balancer 40 along the attachment groove 36 to obtain the distance r1 displayed on the display screen 172, the operator tightens the nut 44 to the bolt 37 to secure the balancer 40 to the rotary table 30.

If the difference β does not satisfy the balance requirement, the main control section 110 causes the display 170 to display that even if the balancer is attached, the rotational imbalance cannot be corrected, and the workpiece W must be reattached.

According to the multi-tasking machine 10 configured as described above, the main control section 110, which functions as a vibration detection section, detects vibration of the rotary table 30 during rotation of the rotary table 30. Based on the detected vibration, the weight M of the workpiece, and the physical quantity (the rotation speed N and the angular speed ω) representing the rotation state of the rotary table 30, the main control section 110, which functions as an arrangement position computing section, computes the arrangement position (the eccentricity amount R and the eccentricity angle θ) of the workpiece W with respect to the rotary table 30. The main control section, which functions as an attachment position computing section, computes the attachment position (the balancer attachment angle (θ+π)) of the balancer 40 with respect to the rotary table 30 based on the computed eccentricity angle θ. Therefore, the attachment position of the balancer 40 with respect to the rotary table 30 is easily grasped. Since the main control section 110, which functions as a selecting section, selects one of the attachment grooves 36 that has the arrangement angle $\alpha_m$ closest to the balancer attachment angle (θ+π), the vibration of the rotary table 30 is easily suppressed by attaching the balancer 40 to the selected one of the attachment grooves 36.

In the first embodiment, the main control section 110, which functions as a weight computing section, computes the weight $_m$ of the balancer 40 to be used based on, for example, the eccentricity amount R. Furthermore, the weight $m_m$ is displayed on the display 170. Therefore, the operator easily grasps the weight of the balancer 40 to be used. Since the arrangement angle $\alpha_m$ of the attachment groove 36 to which the balancer 40 should be attached is displayed on the display 170, the operator easily grasps the attachment groove 36 to which the balancer 40 is to be attached. Therefore, the operator can easily and properly attach the balancer 40 to the attachment groove 36 following the information displayed on the display 170.

In addition, the multi-tasking machine 10 of the first embodiment has the operation area Ar for the operator at part of the surrounding area of the rotary table 30. When the rotary table 30 is stopped, the attachment groove 36 closest to the ideal balancer attachment angle (θ+π) is arranged opposite to the operation area Ar. Therefore, the operator can easily attach the balancer 40 to the attachment groove 36 located opposite to the operation area Ar.

A second embodiment of the present invention will now be described with reference to FIGS. 19 and 20 centered on the difference from the first embodiment.

The second embodiment differs from the first embodiment in the processes of steps S90 and S100 of FIG. 5, that is, the procedure for correcting the rotational imbalance of the rotary table 30.

In the first embodiment, the single balancer 40 is attached to the rotary table 30 to correct the rotational imbalance of the rotary table 30. In this case, the vibration of the rotary table 30 is suppressed to be within the permissible value, but the vibration cannot be made zero in theory. Furthermore, if the difference β between the ideal attachment angle (θ+π) of the balancer 40 and the arrangement angle $\alpha_m$ closest to the ideal attachment angle (θ+π) does not satisfy the predetermined balance requirement (−π/3<β<π/3), the vibration cannot be suppressed.

Contrastingly, in the second embodiment, two balancers 40 are attached to the attachment positions $P_m$, $P_{m+1}$ having the arrangement angles $\alpha_m$, $\alpha_{m+1}$, that satisfy the following equation (9).

$$\alpha_m < (\theta + \pi) \leq \alpha_{m+1} \qquad (9)$$

Figure 19:
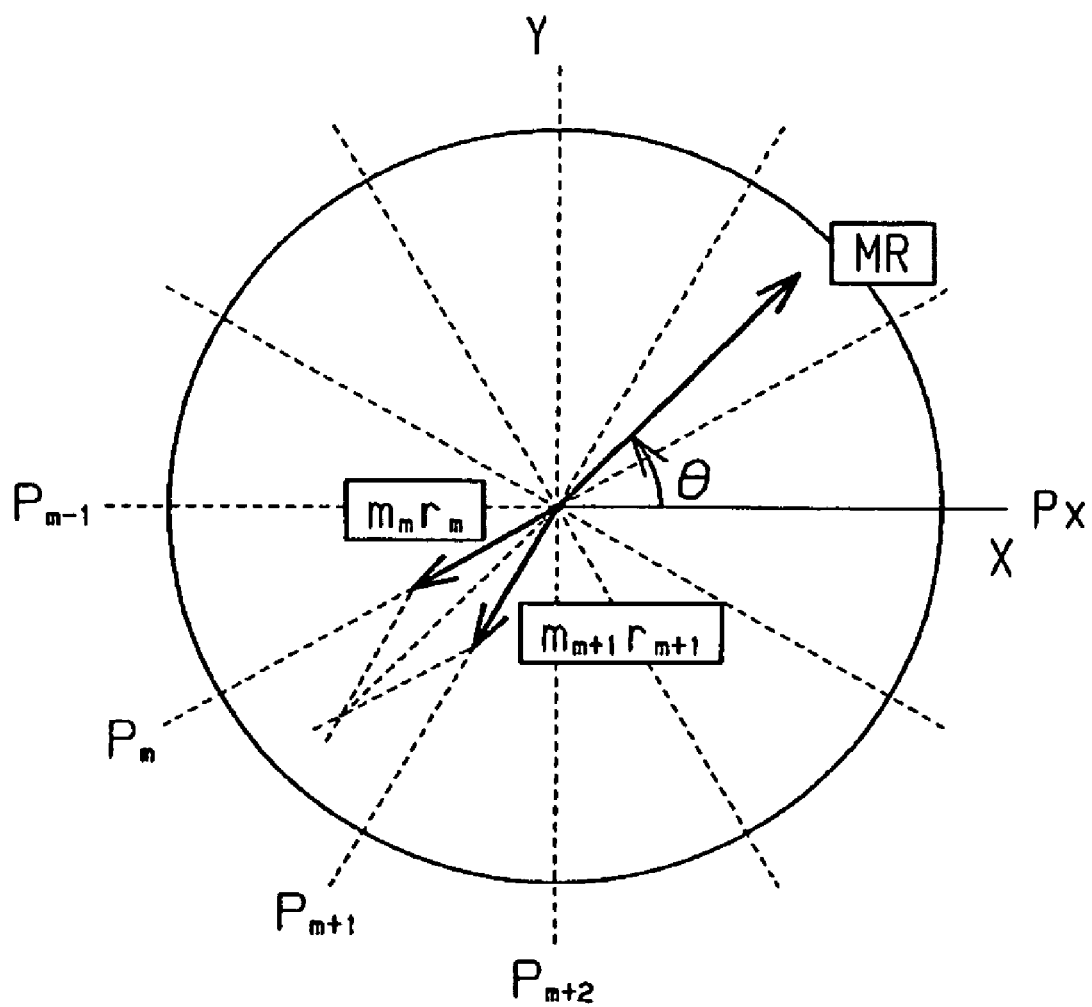
Figure 20:
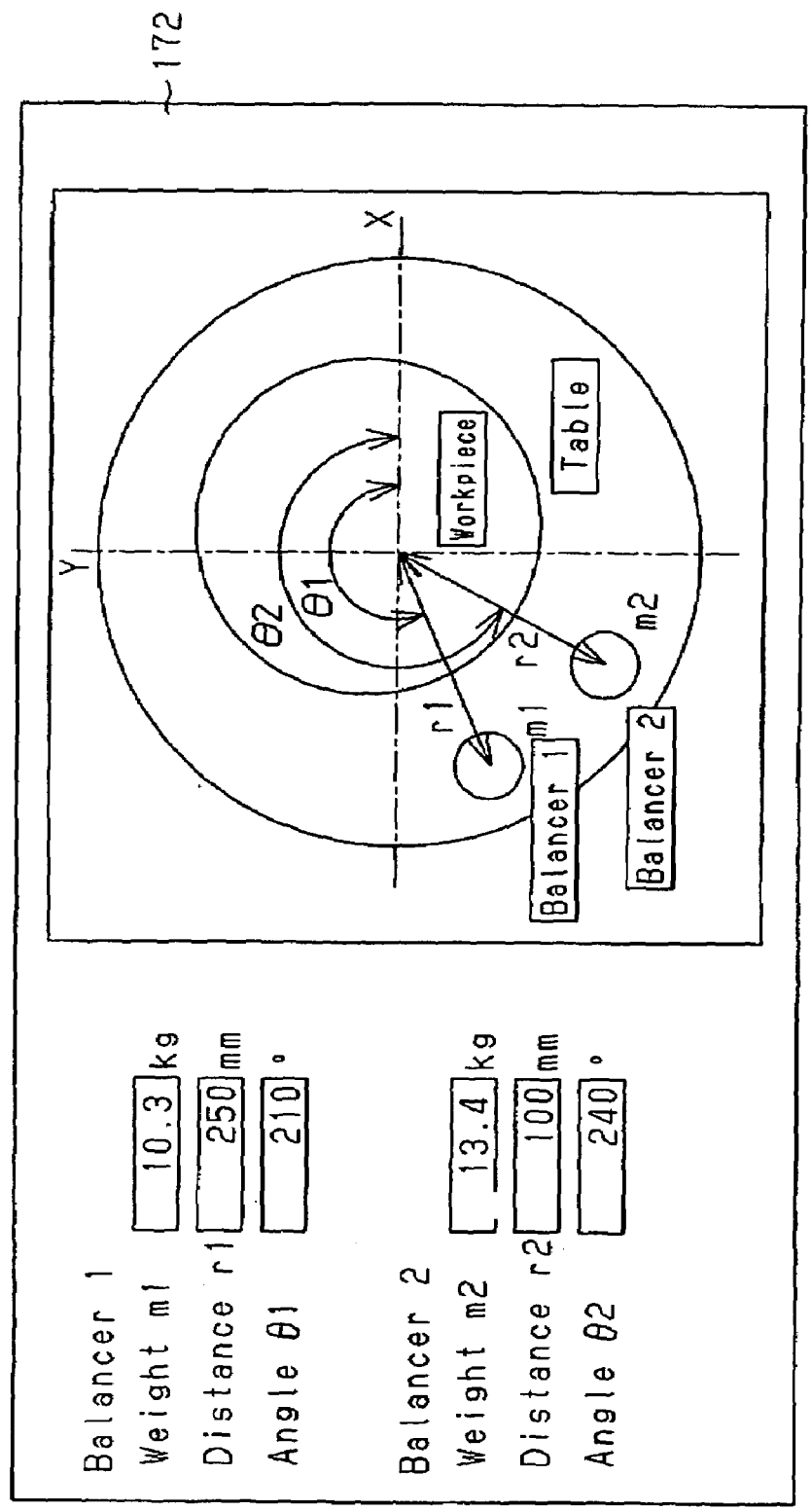
FIG. 20 is an explanatory diagram illustrating a display screen according to a second embodiment.

Assuming that the distances between the rotational center (C-axis) of the rotary table 30 and the attachment positions $P_m$, $P_{m+1}$ are $r_m$, $r_{m+1}$, and the weight of the balancers 40 corresponding to the attachment positions $P_m$, $P_{m+1}$ are $m_m$, $m_{m+1}$, the following equation (10) is satisfied in the X-axis direction and the following equation (11) is satisfied in the Y-axis direction due to the balance of moment as shown in FIG. 19. The values of the distances $r_m$ and $r_{m+1}$ are stored in the system program memory 130 in advance.

$$MR \cos \theta + m_m r_m \cos \alpha_m + m_{m+1} r_{m+1} \cos \alpha_{m+1} = 0 \qquad (10)$$

$$i\, MR \sin \theta + m_m r_m \sin \alpha_m + m_{m+1} r_{m+1} \sin \alpha_{m+1} = 0 \qquad (11)$$

The following equations (12) and (13) are obtained from the equations (10) and (11).

$$m_m = \frac{MR \sin(\theta - \alpha_{m+1})}{r_m \sin(\alpha_m - \alpha_{m+1})} \qquad (12)$$

$$m_{m+1} = \frac{MR \sin(\theta - \alpha_m)}{r_{m+1} \sin(\alpha_m - \alpha_{m+1})} \qquad (13)$$

In the second embodiment, at step S90 of FIG. 5, the main control section 110 selects two attachment positions $P_m$, $P_{m+1}$ having the arrangement angles $\alpha_m$, $\alpha_{m+1}$ that are adjacent to each other with the balancer attachment angle (θ+π) in between. More specifically, the main control section 110 computes, in the same manner as the first embodiment, the difference β between each of the arrangement angles $\alpha_n$ (N=0 to 11) and the ideal balancer attachment angle (θ+π). The main control section 110 then selects, as the arrangement angle $\alpha_m$, one of the arrangement angles $\alpha_n$ smaller than the balancer attachment angle (θ+π) that causes the absolute value of the difference β to be the minimum, and as the arrangement angle $\alpha^{m+1}$, one of the arrangement angles $\alpha_n$ greater than the balancer attachment angle (θ+π) that causes the absolute value of the difference β to be the minimum. The main control section 110 then selects the attachment positions $P_m$, $P_{m+1}$ corresponding to the arrangement angles $\alpha_m$, $\alpha_{m+1}$.

The main control section 110 computes the weights $m_m$, $m_{m+1}$ of the balancers 40 corresponding to the attachment positions $P_m$, $P_{m+1}$ using the above equations (12) and (13). In the second embodiment also, in the same manner as the first embodiment, the main control section 110 performs computation of the eccentricity amount R, computation of the eccentricity angle θ, and computation of the balancer attachment angle (θ+π).

In the second embodiment, at step S100 of FIG. 5, the main control section 110 outputs a display signal representing the correction information of the rotational imbalance of the rotary table 30 to the display 170 based on the computation results at step S90. The correction information includes the weights m1 (m1=$m_m$), m2 (m2=$m_{m+1}$) of the two balancers 40 to be used, the distances r1 (r1=$r_m$), r2 (r2=$r_{m+1}$) from the rotational center of the rotary table 30 to the attachment positions of the balancers 40, and the arrangement angles θ1 (θ1=$\alpha_m$), θ2 (θ2=$\alpha_{m+1}$) of the two attachment grooves 36 (attachment regions) to which the balancers 40 should be attached. As shown in FIG. 20, the display 170 displays the correction information on the display screen 172 based on the display signal. The main control section 110 also outputs a control signal to the display 170 such that the arrangement of the two balancers 40 on the rotary table 30 is displayed on the display screen 172.

The operator prepares the two balancers 40 having the weights $m_m$, $m_{m+1}$ displayed on display screen 172. The two attachment grooves 36 to which the balancers 40 should be attached are arranged in the vicinity of or facing the machine door 510. Therefore, at the operation area Ar, the operator inserts the bolt 37 to each of the attachment grooves 36 and attaches each balancer 40 to a portion of the bolt 37 protruding from the corresponding attachment groove 36. After moving the balancers 40 along the attachment grooves 36 to obtain the distances r1, r2 displayed on the display screen 172, the operator tightens the nut 44 to each bolt 37 to secure each balancer 40 to the rotary table 30.

According to the second embodiment, the main control section 110 selects one of the attachment grooves 36 having the arrangement angle $\alpha_{m+1}$ that is greater than and is closest to the balancer attachment angle (θ+π), and one of the attachment grooves 36 having the arrangement angle $\alpha_m$ that is smaller than and is closest to the balancer attachment angle (θ+π). The main control section 110 displays the selection results on the display 170. Therefore, the operator can easily and properly attach the balancers 40 to the two attachment grooves 36 in accordance with the information displayed on the display 170. As a result, the vibration of the rotary table 30 is eliminated substantially.

The present invention is not restricted to the illustrated embodiments but may be embodied in the following modifications.

In each of the above embodiments, the present invention need not be applied to the multi-tasking machine, but may be embodied in various types of machine tools equipped with the rotary table. The rotary table 30 is not limited to one that moves in a uniaxial direction, but may be one that moves in a biaxial direction of X-axis and Y-axis.

At step S60 of FIG. 5, the main control section 110 determines whether the number of rotations of the rotary table 30 has reached the predetermined determination number of times. However, instead of this, the main control section 110 may determine whether a determination time corresponding to the determination number of times has elapsed. In this case, a timer for measuring time is used. The determination time is computed using, for example, the following expression.

Determination Time [ms]=(determination number of times)×60000/(target rotation speed [min$^{-1}$] of rotary table)

The balancer attachment portion provided on the rotary table 30 is not limited to the attachment groove 36, but may be provided in any form as long as the balancer 40 can be attached.

In each of the above embodiments, the balancer may be attached to the rotary table 30 using a balancer automatic attachment apparatus (not shown). The balancer automatic attachment apparatus is provided, for example, at the operation area Ar. In the first embodiment, for example, the main control section 110 outputs, to the balancer automatic attachment apparatus, the correction information including the weight m1 of the balancer 40 to be used, the distance r1 from the rotational center of the rotary table 30 to the attachment position of the balancer 40, and the arrangement angle θ1 of attachment groove 36 to which the balancer 40 should be attached. The balancer automatic attachment apparatus selects and attaches the balancer 40 based on the entered correction information. That is, the balancer automatic attachment apparatus selects the balancer 40 having the instructed weight m1 and attaches the selected balancer 40 to the attachment groove 36 located at the instructed arrangement angle θ at the instructed distance r1.

The invention claimed is:

1. A machine tool comprising:
   a rotary table on which an object is mounted;
   a vibration detection section, which detects vibration of the rotary table during rotation of the rotary table on which the object is mounted;
   an arrangement position computing section, which computes the arrangement position of the mounted object with respect to the rotary table based on the detected vibration, the weight of the mounted object, and physical quantity representing the rotation state of the rotary table; and
   an attachment position computing section, which computes the attachment position of a balancer with respect to the rotary table based on the computed arrangement position of the mounted object.

2. The machine tool according to claim 1, wherein the arrangement position of the mounted object with respect to the rotary table includes the radial displacement of the mounted object with respect to the rotational center of the rotary table and the displacement angle of the mounted object in the circumferential direction with respect to a predetermined reference orientation position defined on the rotary table.

3. The machine tool according to claim 1, wherein the attachment position of the balancer with respect to the rotary table is represented by a balancer attachment angle, which is the circumferential angle between a predetermined reference orientation position defined on the rotary table and the attachment position.

4. The machine tool according to claim 3, further comprising:
   a plurality of balancer attachment portions located on the rotary table, and each having a different arrangement angle with respect to the reference orientation position; and
   a selecting section, which selects one of the balancer attachment portions having the arrangement angle closest to the computed balancer attachment angle.

5. The machine tool according to claim 4, further comprising a display, which displays information representing the selection result of the selecting section.

6. The machine tool according to claim 4, wherein an operation area is provided at a part of the surrounding area of the rotary table for attaching the balancer to the rotary table, the machine tool further comprising a rotation control section, which controls rotation of the rotary table such that the balancer attachment portion selected by the selecting section is arranged to correspond to the operation area.

7. The machine tool according to claim 3, further comprising:
   a plurality of balancer attachment portions located on the rotary table, and each having a different arrangement angle with respect to the reference orientation position; and
   a selecting section, which selects one of the balancer attachment portions having the arrangement angle greater than and closest to the computed balancer attachment angle and one of the balancer attachment portions having the arrangement angle smaller than and closest to the computed balancer attachment angle.

8. The machine tool according to claim 1, further comprising a weight computing section, which computes the weight of the balancer that should be attached to the rotary table based on the weight of the mounted object and the arrangement position of the mounted object.

9. The machine tool according to claim 8, further comprising a display, which displays information representing the computation result of the weight computing section.

10. The machine tool according to claim 1, further comprising a movement device, which moves the rotary table along a predetermined moving direction, and the vibration detection section detects vibration of the rotary table in the moving direction.

11. A machine tool, comprising:
    a rotary table;
    a rotary drive device, which rotates the rotary table;
    a movement device, which moves the rotary table along a predetermined moving direction;
    a control section, which controls the movement device, and the control section configures a servo system, which includes a position feedback loop; and
    a vibration detection section, which detects vibration of the rotating rotary table based on an input value entered in the position feedback loop.

12. The machine tool according to claim 11, wherein the vibration detection section detects vibration of the rotary table based on fluctuation of a position droop, which is computed by the servo system based on the input value.

13. The machine tool according to claim 12, further comprising a position detector, which outputs a signal representing the position of the rotary table in the moving direction, the input value includes a position command for the rotary table and an output signal of the position detector, and the position droop is a difference between the position command and the output signal.

* * * * *